(12) United States Patent
Nakazawa et al.

(10) Patent No.: US 10,670,214 B2
(45) Date of Patent: Jun. 2, 2020

(54) VEHICLE LAMP AND VEHICLE HAVING THE SAME

(71) Applicant: KOITO MANUFACTURING CO., LTD., Tokyo (JP)

(72) Inventors: Misako Nakazawa, Shizuoka (JP); Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 379 days.

(21) Appl. No.: 15/468,418

(22) Filed: Mar. 24, 2017

(65) Prior Publication Data

US 2017/0276309 A1  Sep. 28, 2017

(30) Foreign Application Priority Data

Mar. 25, 2016  (JP) .................................. 2016-062064

(51) Int. Cl.
*F21S 41/32* (2018.01)
*F21S 41/255* (2018.01)
(Continued)

(52) U.S. Cl.
CPC ............ *F21S 41/27* (2018.01); *B60Q 1/0011* (2013.01); *B60Q 1/0035* (2013.01); *B60Q 1/04* (2013.01);
(Continued)

(58) Field of Classification Search
None
See application file for complete search history.

(56) References Cited

U.S. PATENT DOCUMENTS 7,086,766 B2 *  8/2006  Inaba ................... F21S 48/1394
                                                         359/838
7,311,430 B2 * 12/2007  Tsukamoto ........... F21S 41/147
                                                         362/545
(Continued)

FOREIGN PATENT DOCUMENTS

CN         102374486 A      3/2012
DE    102011087309 A1       5/2013
(Continued)

OTHER PUBLICATIONS

Office Action issued in Chinese Application No. 201710181600.6, dated Apr. 1, 2019 (12 pages).
(Continued)

*Primary Examiner* — Britt D Hanley
(74) *Attorney, Agent, or Firm* — Osha Liang LLP

(57) ABSTRACT

A vehicle lamp comprises a first light source group for forward illumination comprising at least one light emitting element, a second light source group for road surface drawing comprising at least one light emitting element provided separately from the at least one light emitting element, a single projection lens through which lights emitted from the first and second light source groups are to pass, and a light shade arranged between the first and second light source groups and the projection lens so that the light from the first light source group and the light from the second light source group do not intersect with each other before entering the projection lens. The projection lens has a first region through which the light from the first light source group is to pass and a second region through which the light from the second light source group is to pass.

13 Claims, 16 Drawing Sheets

(51) Int. Cl.
*F21S 41/143* (2018.01)
*F21S 41/43* (2018.01)
*F21S 41/20* (2018.01)
*F21S 41/24* (2018.01)
*B60Q 1/04* (2006.01)
*F21S 41/27* (2018.01)
*B60Q 1/00* (2006.01)
*B60Q 1/08* (2006.01)
*F21S 41/275* (2018.01)
*F21S 41/663* (2018.01)
*B60Q 1/14* (2006.01)

(52) U.S. Cl.
CPC ............. *B60Q 1/085* (2013.01); *B60Q 1/143* (2013.01); *F21S 41/143* (2018.01); *F21S 41/24* (2018.01); *F21S 41/255* (2018.01); *F21S 41/275* (2018.01); *F21S 41/285* (2018.01); *F21S 41/321* (2018.01); *F21S 41/322* (2018.01); *F21S 41/323* (2018.01); *F21S 41/43* (2018.01); *F21S 41/663* (2018.01); *B60Q 2300/42* (2013.01); *B60Q 2300/45* (2013.01); *B60Q 2400/50* (2013.01)

(56) References Cited

U.S. PATENT DOCUMENTS

| | | | | |
|---|---|---|---|---|
| 7,654,714 B2* | 2/2010 | Mochizuki | ........... | B60Q 1/0041 362/539 |
| 7,699,513 B2* | 4/2010 | Nakada | ................ | F21S 41/147 362/538 |
| 8,042,981 B2* | 10/2011 | Kotajima | .............. | F21S 41/147 362/538 |
| 8,226,285 B2* | 7/2012 | Kotajima | ................ | F21S 43/50 362/543 |
| 8,690,405 B2* | 4/2014 | Sekiguchi | ............... | F21V 13/12 362/538 |
| 8,858,048 B2* | 10/2014 | Nakazato | .............. | F21S 41/125 362/510 |
| 9,593,818 B2* | 3/2017 | Mochizuki | ........... | F21S 41/147 |
| 9,644,810 B2* | 5/2017 | Yamamoto | ........... | F21S 41/147 |
| 10,267,476 B2* | 4/2019 | Ugajin | .................... | F21S 41/25 |
| 2007/0041207 A1* | 2/2007 | Ishida | .................. | B60Q 1/0041 362/538 |
| 2007/0201241 A1 | 8/2007 | Komatsu | | |
| 2008/0253141 A1 | 10/2008 | Nakada et al. | | |
| 2009/0290372 A1 | 11/2009 | Kotajima et al. | | |
| 2012/0057363 A1 | 3/2012 | Ishida et al. | | |
| 2012/0243203 A1* | 9/2012 | Koike | ..................... | F21S 41/14 362/19 |
| 2013/0083553 A1 | 4/2013 | Sekiguchi | | |
| 2014/0321143 A1 | 10/2014 | Hossfeld et al. | | |
| 2015/0375672 A1 | 12/2015 | Takahashi | | |
| 2017/0227184 A1* | 8/2017 | Ishida | .................... | F21S 41/00 |
| 2017/0276309 A1* | 9/2017 | Nakazawa | ........... | F21S 41/143 |
| 2017/0276310 A1* | 9/2017 | Nakazawa | ........... | B60Q 1/0035 |

FOREIGN PATENT DOCUMENTS

| | | |
|---|---|---|
| JP | 2005-161977 A | 6/2005 |
| JP | 2007227228 A | 9/2007 |
| JP | 2008262755 A | 10/2008 |
| JP | 2009283408 A | 12/2009 |
| JP | 2012059409 A | 3/2012 |
| JP | 2016011039 A | 1/2016 |

OTHER PUBLICATIONS

Office Action issued in Japanese Application No. 2016-062064; dated Oct. 23, 2019 (13 pages).
Office Action issued in French Application No. 1752422; dated Jun. 28, 2019 (9 pages).

* cited by examiner

VEHICLE LAMP AND VEHICLE HAVING THE SAME

CROSS-REFERENCE TO RELATED APPLICATION

The present application claims the benefit of priority of Japanese Patent Application No. 2016-062064, filed on Mar. 25, 2016, the disclosure of which is incorporated herein by reference.

TECHNICAL FIELD

The disclosure relates to a vehicle lamp capable of illuminating a light distribution pattern for road surface drawing as well as a light distribution pattern for forward illumination of a vehicle with a single unit, and a vehicle having the vehicle lamp.

BACKGROUND ART

A publication of Japanese Patent Application No. 2005-161977 discloses a vehicle travel support device, which includes a locus estimation unit configured to estimate an own vehicle advancing locus and a low-speed moving object detection unit configured to detect a low-speed moving object such as a pedestrian and is configured to draw, on a road surface, a laser light to be emitted from a laser projector so that a predetermined illumination shape (for example, a stop line figure configured by a vertically long line) is made over a predetermined range around an intersection position of the own vehicle advancing locus with a moving locus of the low-speed moving object or a position in the vicinity of the intersection position.

As disclosed in the publication of Japanese Patent Application No. 2005-161977, the device configured to draw a predetermined mark on the road surface by using the laser light is mounted separately from a usual lamp for forward illumination. Therefore, it is necessary to secure a space in a lamp unit such as a headlight.

SUMMARY OF THE INVENTION

It is therefore an object of the disclosure to provide a vehicle lamp capable of forming a light distribution pattern for road surface drawing as well as a light distribution pattern for forward illumination of a vehicle with a single unit, and a vehicle having the vehicle lamp.

The present invention provides a vehicle lamp comprising
a first light source group for forward illumination comprising at least one light emitting element;
a second light source group for road surface drawing comprising at least one light emitting element provided separately from the at least one light emitting element;
a single projection lens through which lights emitted from the first light source group and the second light source group are to pass, and
a light shade arranged between the first and second light source groups and the projection lens so that the light from the first light source group and the light from the second light source group do not intersect with each other before entering the projection lens,
wherein the projection lens has a first region through which the light from the first light source group is to pass and a second region through which the light from the second light source group is to pass.

According to this configuration, since it is possible to form a light distribution pattern for road surface drawing as well as a light distribution pattern for forward illumination of a vehicle with a single unit, it is possible to save a space while satisfying both functions of the forward illumination and the road surface drawing.

The projection lens of the vehicle lamp may be formed with a first diffusion step configured to further extend a light source image of the second light source group in an upper and lower direction of the lamp than in a right and left direction of the lamp and a second diffusion step configured to further extend a light source image of the first light source group in the right and left direction of the lamp than in upper and lower direction of the lamp.

According to this configuration, the projection lens is formed with the first diffusion step and the second diffusion step. Therefore, it is possible to form the light distribution pattern further extending in the right and left direction than in the upper and lower direction of the vehicle, as the light distribution pattern for forward illumination, while forming the light distribution pattern further extending in the upper and lower direction than in the right and left direction of the vehicle, as the light distribution pattern for road surface drawing.

The first diffusion step of the vehicle lamp may comprise a step configured to further extend the light source image of the first light source group in the upper and lower direction of the lamp than in the right and left direction of the lamp.

According to this configuration, it is possible to form the light distribution pattern, extending so that it becomes parallel light, which is substantially the same in the right and left direction and the upper and lower direction of the vehicle, as the light distribution pattern for forward illumination.

The first diffusion step of the vehicle lamp may be formed on an incident surface of the projection lens, and the second diffusion step of the vehicle lamp may be formed on an output surface of the projection lens, in the first region.

It is possible to conveniently obtain a desired light distribution pattern by changing an optical characteristic for each region of the projection lens.

The light shade of the vehicle lamp may have a first surface arranged to face toward the first light source group and a second surface arranged to face toward the second light source group, and a high-reflectivity treatment may have been performed for one or both of the first surface and the second surface.

According to this configuration, since the light reflected on the light shade can also be used for light distribution, it is possible to widen an illumination range of each light distribution pattern, which is to be formed by each light source image of the first light source group and the second light source group.

The light shade of the vehicle lamp may have a first surface arranged to face toward the first light source group and a second surface arranged to face toward the second light source group, and a low-reflectivity treatment may have been performed for one or both of the first surface and the second surface.

According to this configuration, a situation where the light from the first light source group gets into the second region of the projection lens or the light from the second light source group enters the first region of the projection lens does not occur. Therefore, it is possible to prevent an unintended light distribution.

The light shade has a first surface arranged to face toward the first light source group and a second surface arranged to face toward the second light source group, and a low-reflectivity treatment has been performed for one or both of the first surface and the second surface.

According to this configuration, it is possible to form both the light distribution pattern for forward illumination and the light distribution pattern for road surface drawing with a single unit by a combination of the additional optical system and the step of the projection lens.

The present invention also provides a vehicle lamp comprising a first light source group for forward illumination comprising at least one light emitting element;

a second light source group for road surface drawing comprising at least one light emitting element provided separately from the at least one light emitting element;

a single projection lens through which lights emitted from the first light source group and the second light source group are to pass, and a first additional optical system provided to be close to the first light source group between the first light source group and the projection lens, wherein the projection lens is configured to further extend respective light source images of the first light source group and the second light source group in an upper and lower direction of the lamp than in a right and left direction of the lamp, and wherein the first additional optical system is configured to further extend the light source image of the first light source group in the right and left direction of the lamp than in the upper and lower direction of the lamp.

The present invention also provides a vehicle lamp comprising a first light source group for forward illumination comprising at least one light emitting element;

a second light source group for road surface drawing comprising at least one light emitting element provided separately from the at least one light emitting element;

a single projection lens through which lights emitted from the first light source group and the second light source group are to pass;

a first additional optical system provided to be close to the first light source group between the first light source group and the projection lens, and a second additional optical system provided to be close to the second light source group between the second light source group and the projection lens, wherein the first additional optical system is configured to further extend a light source image of the first light source group in a right and left direction of the lamp than in an upper and lower direction of the lamp, and wherein the second additional optical system is configured to further extend a light source image of the second light source group in the upper and lower direction of the lamp than in the right and left direction of the lamp.

According to this configuration, it is possible to form the light distribution pattern for road surface drawing of which a width is greater in the upper and lower direction than in the right and left direction as well as the light distribution pattern for forward illumination of which a width is substantially the same in the upper and lower direction and the right and left direction, with a single unit. Therefore, it is possible to save the space while satisfying both the functions of the forward illumination and the road surface drawing.

The first additional optical system of the vehicle lamp may be configured by an additional lens having an incident surface arranged to face the first light source group and an output surface arranged to face the projection lens, and the output surface is formed with a third diffusion step configured to extend the light source image of the first light source group.

The second additional optical system of the vehicle lamp may be configured by an additional lens having an incident surface arranged to face the second light source group and an output surface arranged to face the projection lens, and the output surface is formed with a fourth diffusion step configured to extend the light source image of the second light source group.

In the vehicle lamp, the first additional optical system may be configured by a reflector having openings, which are respectively formed on a surface arranged to face the first light source group and a surface arranged to face the projection lens, and the opening formed on the surface arranged to face the projection lens may have a width in the right and left direction of the lamp greater than a width in the upper and lower direction of the lamp.

In the vehicle lamp, the second additional optical system may be configured by a reflector having openings, which are respectively formed on a surface arranged to face the second light source group and a surface arranged to face the projection lens, and the opening formed on the surface arranged to face the projection lens may have a width in the upper and lower direction of the lamp greater than a width in the right and left direction of the lamp.

In the vehicle lamp, the first additional optical system may be configured by a light guide member having an incident surface arranged to face the first light source group and an output surface arranged to face the projection lens, and the output surface may have a width in the right and left direction of the lamp greater than a width in the upper and lower direction of the lamp.

In the vehicle lamp, the second additional optical system may be configured by a light guide member having an incident surface arranged to face the second light source group and an output surface arranged to face the projection lens, and the output surface may have a width in the upper and lower direction of the lamp greater than a width in the right and left direction of the lamp.

In the vehicle lamp, the first additional optical system may be configured by a cylindrical lens, and the cylindrical lens may be arranged so that a focal line direction thereof is parallel with the right and left direction of the lamp.

In the vehicle lamp, the second additional optical system may be configured by a cylindrical lens, and the cylindrical lens may be arranged so that a focal line direction thereof is parallel with the upper and lower direction of the lamp.

According to this configuration, it is possible to obtain the light distribution pattern for forward illumination and the light distribution pattern for road surface drawing with the simple configuration.

In the vehicle lamp, the first light source group may comprise a plurality of the light emitting elements, and the plurality of light emitting elements may be positioned at a rear side relative to a back focal point of the projection lens in a front and rear direction of the lamp.

According to this configuration, the respective light distribution patterns, which are to be formed by the respective light emitting elements of the first light source group, are illuminated with being partially overlapped. Therefore, it is possible to suppress a non-illumination range between the respective light distribution patterns.

The present invention also provides a vehicle having the vehicle lamp mounted to one side of right and left sides of a front side of the vehicle and a lamp for forward illumination mounted to the other side.

Regarding the pair of lamps mounted at right and left sides of the front of the vehicle, one lamp is mounted with a multi-functional lamp unit having two functions of the forward illumination and the road surface drawing and the other lamp is mounted with a single-function lamp unit for forward illumination. Therefore, it is possible to secure the luminous intensity of the light distribution for forward illumination while satisfying both the functions of the forward illumination and the road surface drawing.

According to the disclosure, it is possible to provide the vehicle lamp capable of forming the light distribution pattern, for road surface drawing as well as the light distribution pattern for forward illumination of a vehicle with a single unit, and the vehicle having the vehicle lamp.

DETAILED DESCRIPTION

Hereinafter, illustrative embodiments of the disclosure will be described in detail with reference to the drawings.

First Illustrative Embodiment

Figure 1:
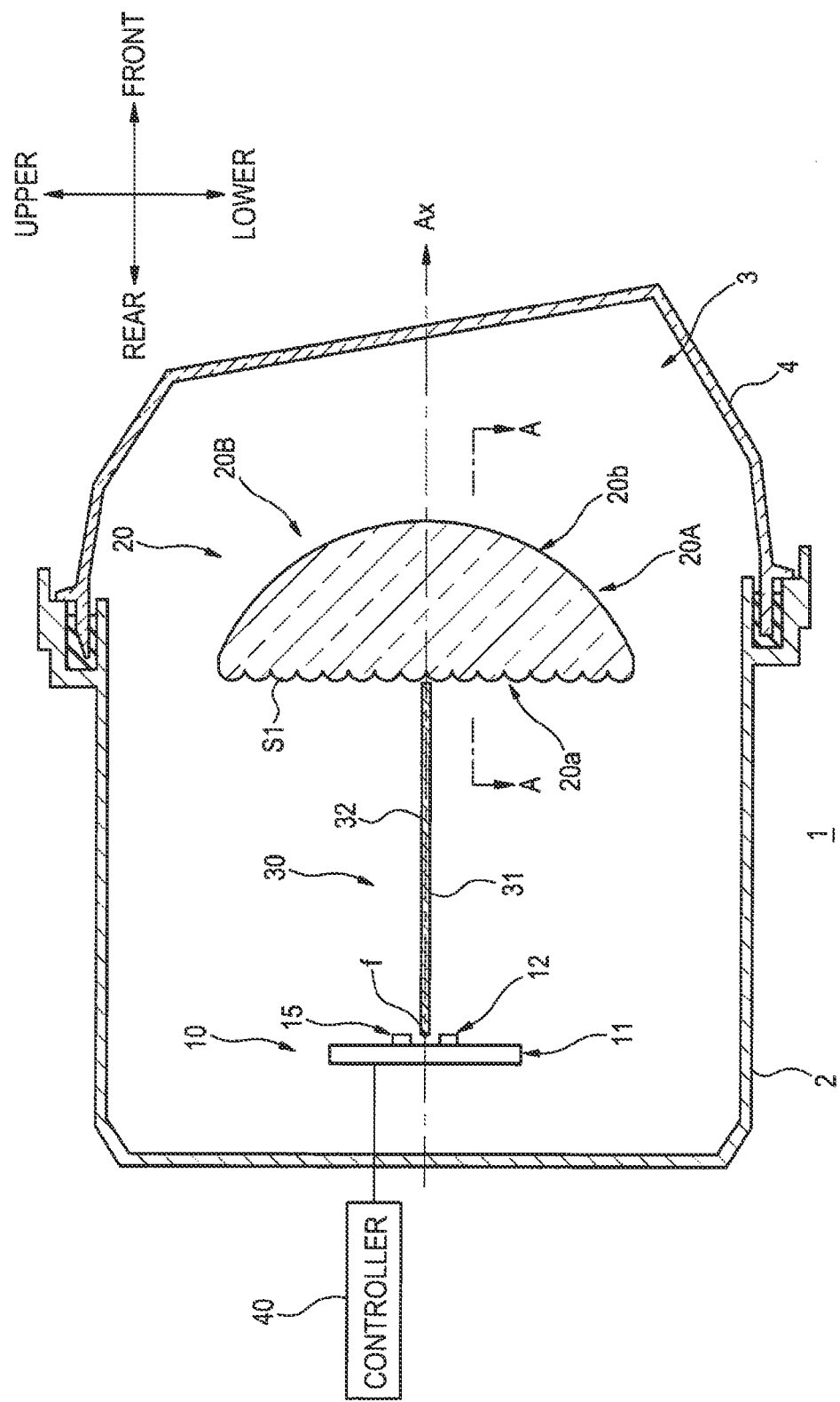
FIG. 1 is a vertically sectional view depicting a schematic structure of a vehicle lamp in accordance with a first illustrative embodiment of the disclosure.
Figure 2:
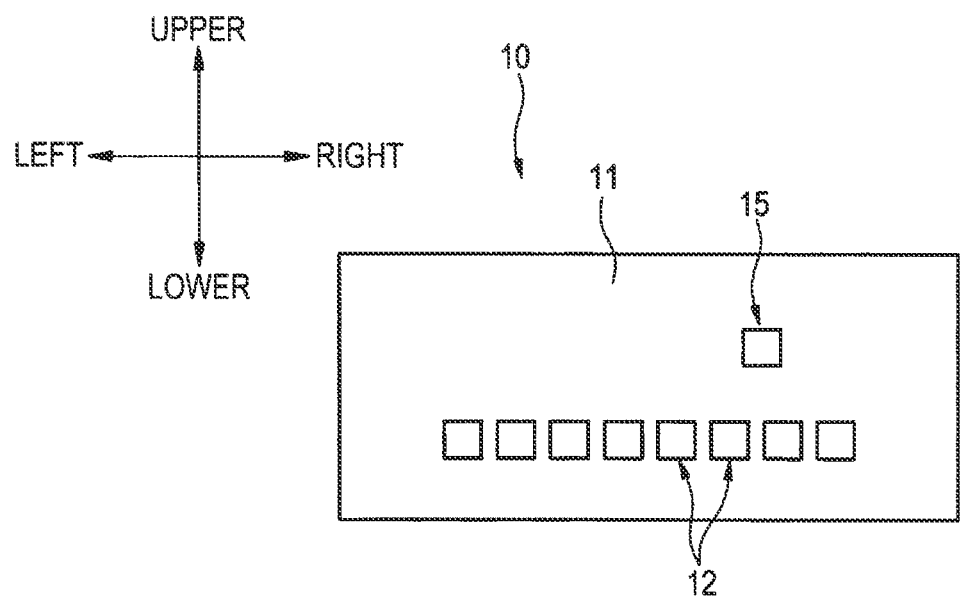
FIG. 2 is a front view of a light source unit of the first illustrative embodiment, as seen from a projection lens-side.

FIG. 1 is a vertically sectional view depicting a schematic structure of a vehicle lamp in accordance with a first illustrative embodiment of the disclosure, and FIG. 2 is a front view of a light source unit of the first illustrative embodiment, as seen from a projection lens-side.

A vehicle lamp 1 of the first illustrative embodiment is a lamp unit for road surface drawing (road surface drawing device) mounted to at least one of a pair of headlights arranged at right and left sides of a front of a vehicle. FIG. 1 depicts a structure of the lamp unit for road surface drawing mounted to one headlight, as the vehicle lamp 1.

As shown in FIG. 1, the vehicle lamp 1 includes a lamp body 2 having an opening formed at a front side of the vehicle and a transparent cover 4 attached so as to cover the opening of the lamp body 2. The transparent cover 4 is formed of resin, glass or the like having transparency. In a lamp chamber 3 formed by the lamp body 2 and the transparent cover 4, a light source unit 10, a projection lens 20 and a light shade 30 are accommodated. The respective constitutional elements are attached to the lamp body 2 by a support mechanism (not shown).

As shown in FIGS. 1 and 2, the light source unit 10 includes a circuit board 11 and a first light source group 12 and a second light source group 15 mounted on the circuit board 11. The first light source group 12 is configured by a plurality of LED chips (eight LED chips, herein) (an example of the light emitting element) arranged along a right and left direction of the vehicle lamp 1. Also, the second light source group 15 is configured by one LED chip (an example of the light emitting element) arranged above the first light source group 12, for example. In the meantime, the first and second light source groups 12, 15 may be configured by, semiconductor light emitting elements other than the LED chips. Also, the numbers of the LED chips configuring the first and second light source group 12, 15 are not limited to the shown example. As shown in FIG. 2, each of the LED chips configuring the first light source group 12 and the second light source group 15 has a substantially square-shaped light emitting surface. In the meantime, each LED chip may have a light emitting surface other than the square shape, such as a rectangular shape. A light source image that is to be formed by light from each LED chip preferably has an aspect ratio of 0.5 to 1.5, which is a ratio of a width in an upper and lower direction to a width in the right and left direction, when a width of the vehicle in the right and left direction is set to 1. Also, the respective LED chips can be individually turned on and off, in response to a control signal from a controller 40.

As shown in FIG. 1, the projection lens 20 has an incident surface 20a and a convex output surface 20b. The incident surface 20a is arranged to face the light emitting surfaces of the first light source group 12 and the second light source group 15, and the output surface 20b is arranged to face ahead of the lamp. The projection lens 20 is arranged so that the light emitting surfaces of the LED chips configuring the first light source group 12 and the second light source group 15 are positioned on a plane orthogonal to a back focal point f on an optical axis Ax. In the meantime, the optical axis Ax of the projection lens 20 preferably faces towards a direction in which the light having passed through the projection lens 20 is to illuminate a road surface in a predetermined range ahead of the lamp.

Figure 3:
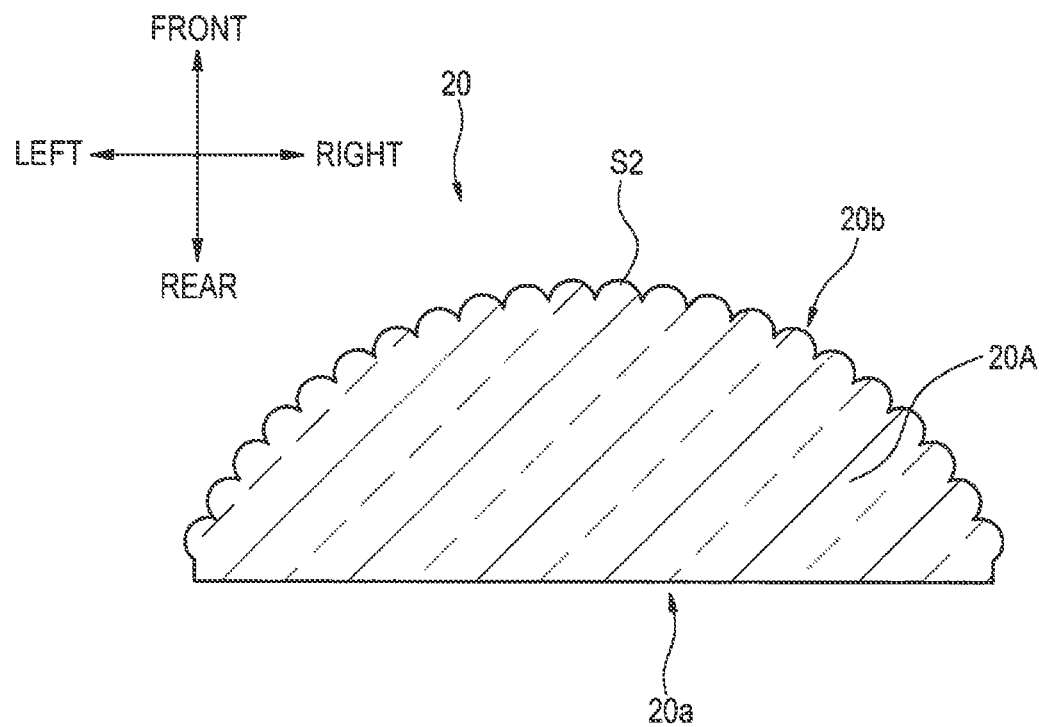
FIG. 3 is a sectional view taken along a line A-A of the projection lens of the first illustrative embodiment.

The incident surface 20a of the projection lens 20 is formed thereon with a plurality of cylindrical steps (S1) (an example of the first diffusion step) arranged in parallel along the upper and lower direction of the lamp, in a vertically sectional view shown in FIG. 1. In the meantime, as shown in FIG. 3, the output surface 20b of the projection lens 20 is formed at a lower half part thereof with a plurality of cylindrical steps (S2) (an example of the second diffusion step) arranged in parallel along the right and left direction of the lamp, in a horizontally sectional view. Meanwhile, the step, which is to be formed on the projection lens 20, is not limited to the cylindrical shape and may be a step having a shape of which tangential lines are continuous (an unevenness shape having tangent continuity) or a step having a shape of which curvatures are continuous (an unevenness shape having curvature continuity). Also, the step is not limited to the curved surface and may have a triangular shape or the like, for example.

Figure 4:
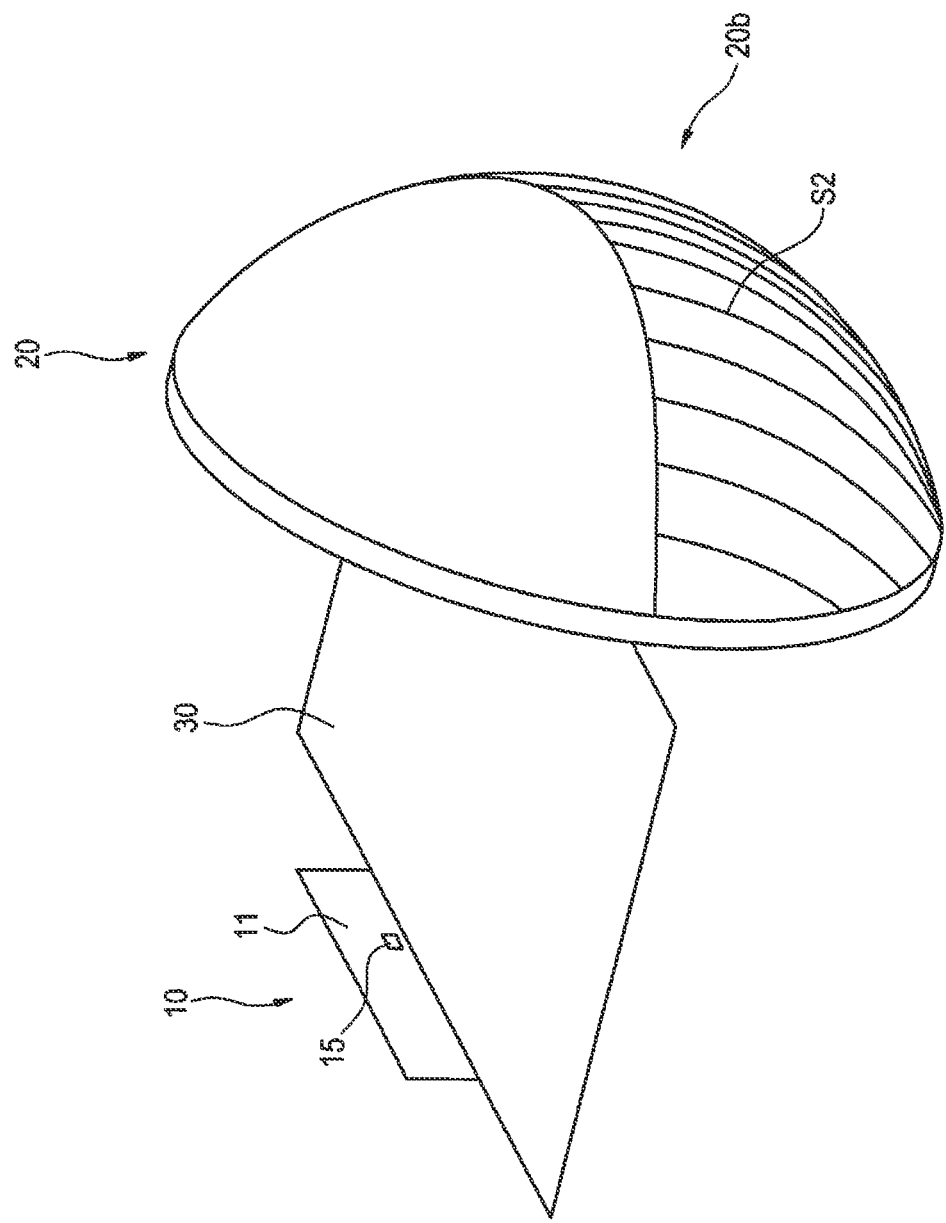
FIG. 4 is a perspective view depicting an arrangement example of the projection lens, a light shade and a light source of the first illustrative embodiment.

As shown in FIGS. 1 and 4, the light shade 30 is a flat plate-shaped member arranged between the light source unit 10 and the projection lens 20. The light shade 30 is provided at a position at which the light from the first light source group 12 and the light from the second light source group 15 do not intersect with each other before entering the projection lens 20. That is, in the vertically sectional view of FIG. 1, the light shade 30 has a width greater than a parallel width of the first light source group 12 consisting of the plurality of LED chips by a predetermined magnitude or greater and is arranged to extend from a region between the first light source group 12 and the second light source group 15 to the vicinity of the incident surface 20a of the projection lens 20. A lower surface 31 and an upper surface 32 of the light shade 30 have been subjected to lusterless black coating or the like for low-reflectivity treatment. Thereby, the lights from the first light source group 12 and the second light source group 15 are respectively absorbed on the upper and lower surfaces 31, 32 of the light shade 30.

The lighting and lights-out of the respective LED chips configuring the first light source group 12 and the second light source group 15, emission intensity adjustment of the lights from the respective LED chips and blinking rate adjustment of the LED chips are performed by the controller 40. Thereby, the controller 40 can change the individual lighting and lights-out of the respective LED chips and the intensities and blinking rates of the respective LED chips. The controller 40 is implemented by a device and a circuit such as a CPU of a computer, a storage unit and the like, as a hardware configuration, and is implemented by a computer program or the like, as a software configuration. In the meantime, the controller 40 is provided outside the lamp chamber 3, as shown in FIG. 1. However, the controller 40 may be provided inside the lamp chamber 3. The controller 40 is configured to receive signals from a lamp switch and the like (not shown) and to transmit a variety of controls signals to the respective LED chips, in response to the received signals.

Figure 5:
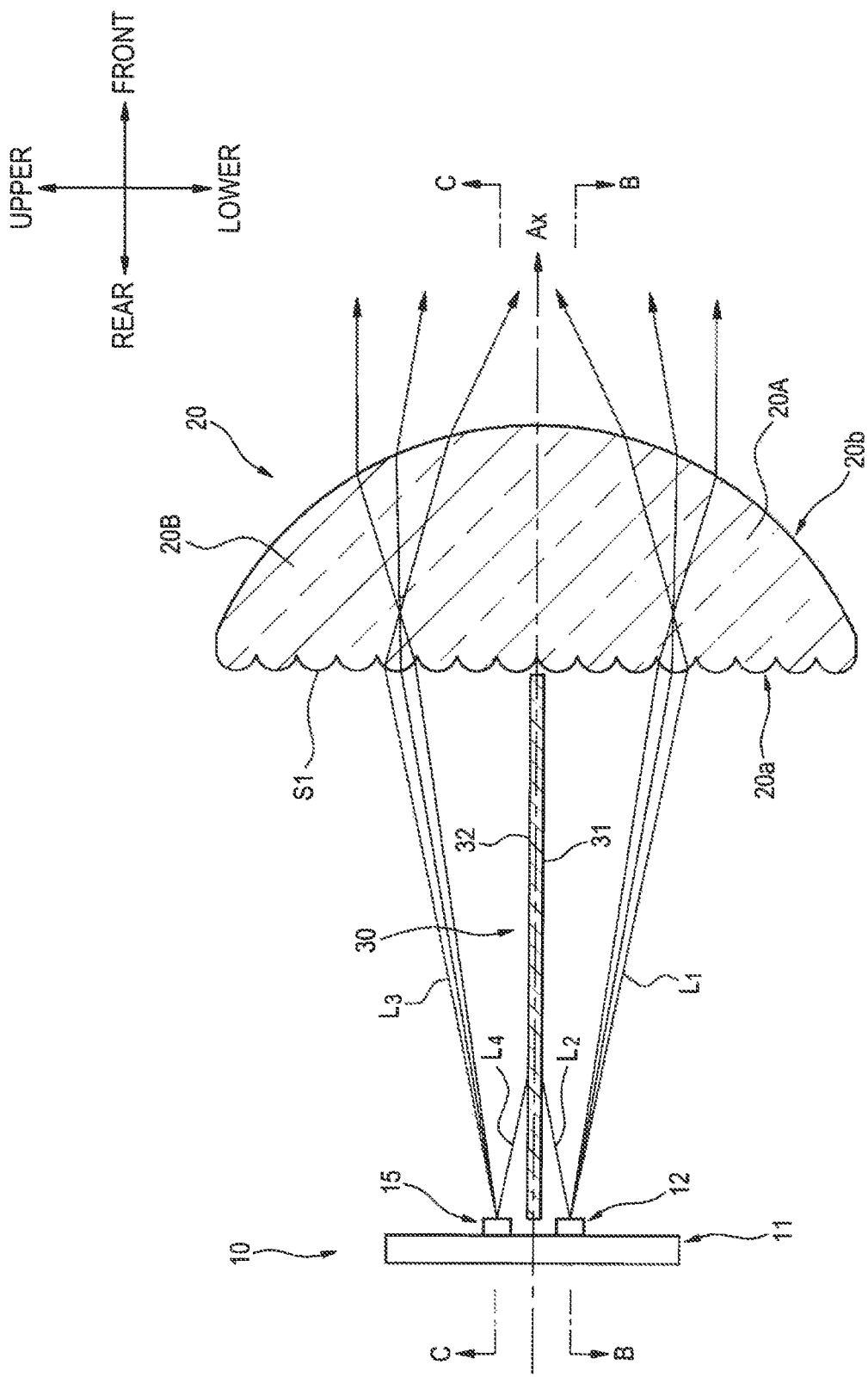
FIG. 5 is a vertically sectional view depicting light paths of lights that are to be emitted from the light sources of the vehicle lamp in accordance with the first illustrative embodiment.
Figure 6:
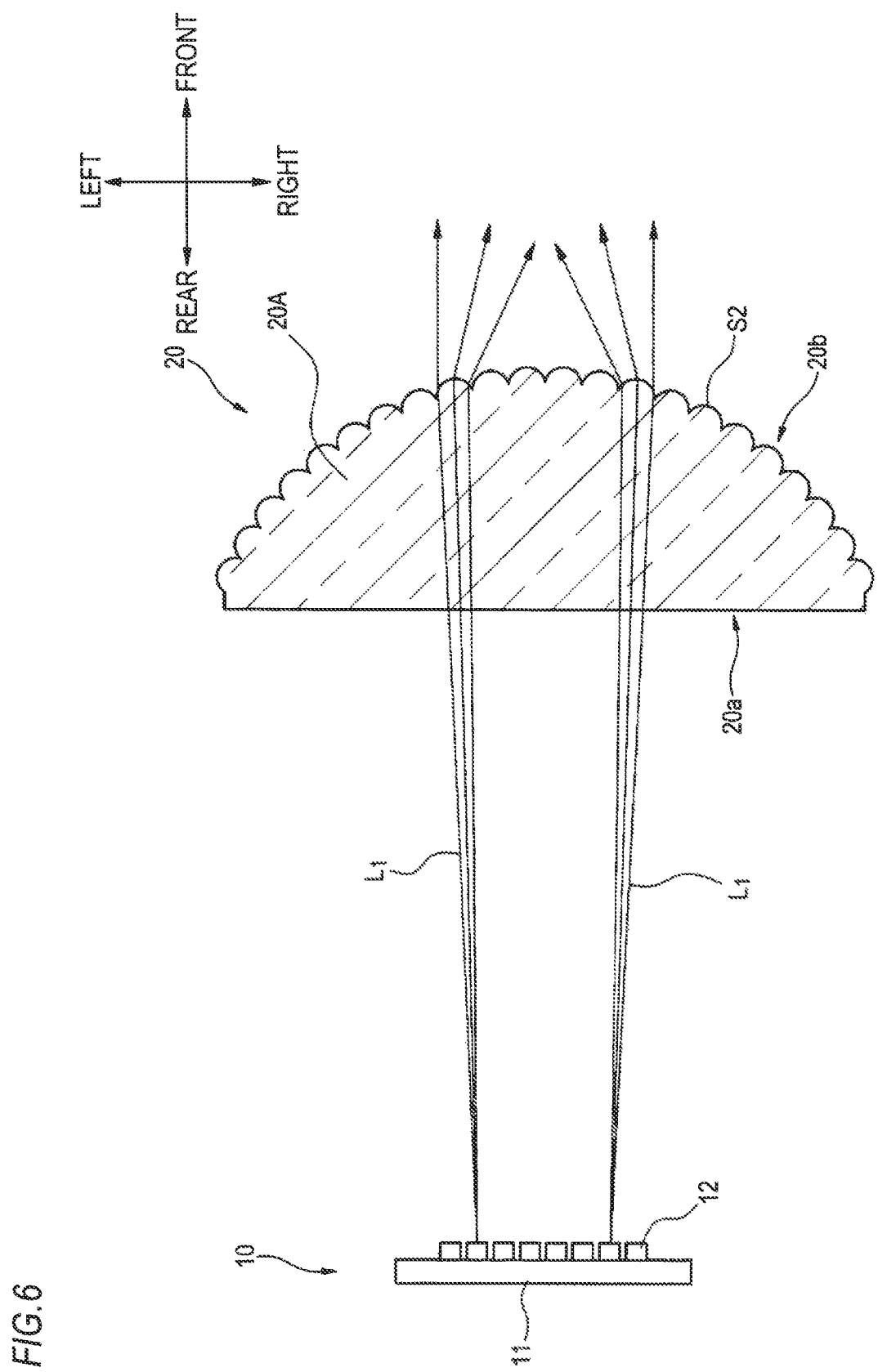
FIG. 6 is a sectional view taken along a line B-B of FIG. 5.

As shown in FIG. 5, the light emitted from each LED chip of the first light source group 12 passes a region below the lower surface 31 of the light shade 30, is incident from the incident surface 20a of the projection lens 20 and is then emitted from the output surface 20b, At this time, the light $L_1$ emitted from the first light source group 12 in parallel with the optical axis Ax or downwards with respect to the optical axis Ax is incident on a region of the lower half part of the incident surface 20a of the projection lens 20. Since the incident surface 20a of the projection lens 20 is formed with the cylindrical steps S1 arranged in parallel along the upper and lower direction of the lamp, light source images of the first light source group 12 are illuminated ahead of the lamp from the output surface 20b by the cylindrical steps S1, as images extending in the upper and lower direction in a plane of the upper and lower direction of the lamp orthogonal to the optical axis Ax. In the meantime, as shown in FIG. 6, since a region of the lower half part of the output surface 20b of the projection lens 20 is formed with the cylindrical steps S2 arranged in parallel along the right and left direction, the light source images of the respective LED chips of the first light source group 12 are illuminated ahead of the lamp from the output surface 20b, as images extending in the right and left direction in a plane of the right and left direction of the lamp including the optical axis Ax. In this way, the light source images of the respective LED chips of the first light source group 12 pass through the projection lens 20, so that they are illuminated ahead of the lamp, as light source images extending in both the upper and lower direction and the right and left direction. On the other hand, since the light $L_2$ emitted upwards from the first light source group 12 with respect to the optical axis Ax is absorbed by the lower surface 31 of the light shade 30, the light $L_2$ is little incident on the projection lens 20.

Figure 7:
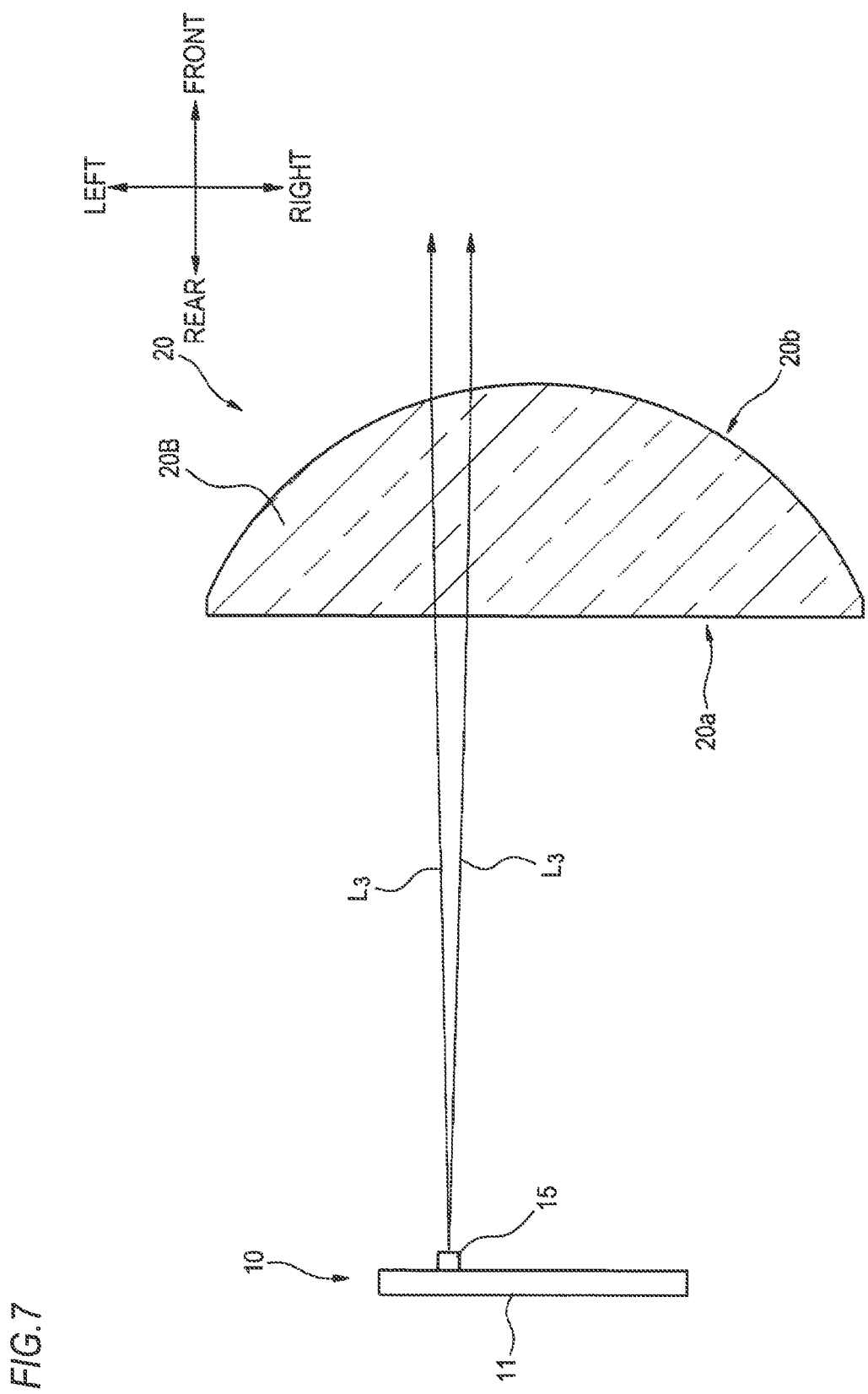
FIG. 7 is a sectional view taken along a line C-C of FIG. 5.

As shown in FIG. 5, the light $L_3$ emitted from the second light source group 15 passes a region above the upper surface 32 of the light shade 30, is incident from the incident surface 20a of the projection lens 20, and is then emitted from the output surface 20b. At this time, the light $L_3$ emitted from the second light source group 15 in parallel with the optical axis Ax or upwards with respect to the optical axis Ax is incident on a region of an upper half part of the incident surface 20a of the projection lens 20. The light source image of the second light source group 15 is illuminated ahead of the lamp from the output surface 20b by the cylindrical steps S1 formed on the incident surface 20a of the projection lens 20, as an image extending in the upper and lower direction in the plane of the upper and lower direction of the lamp orthogonal to the optical axis Ax. In the meantime, as shown in FIG. 7, since the region of the upper half part of the output surface 20b of the projection lens 20 is not formed with the cylindrical steps or the like, the light source image of the second light source group 15 is illuminated ahead of the lamp from the output surface 20b, as a substantially parallel light, without extending in the plane of the right and left direction of the lamp including the optical axis Ax. In this way, the light source image from the second light source group 15 is illuminated ahead of the lamp, as a light source image extending only in the upper and lower direction without extending in the right and left direction. On the other hand, since the light $L_4$ emitted downwards from the second light source group 15 with respect to the optical axis Ax is absorbed by the upper surface 32 of the light shade 30, the light $L_4$ is little incident on the projection lens 20.

Like this, the projection lens 20 has a first region 20A through which the light $L_1$ emitted from the first light source group 12 and incident from the lower half part of the incident surface 20a is to pass and a second region 20B through which the light $L_3$ emitted from the second light source group 15 and incident from the upper half part of the incident surface 20a is to pass. In the first region 20A, which is the lower half part of the projection lens 20, the incident surface 20a is formed with the cylindrical steps S1 arranged in parallel in the upper and lower direction, and the output surface 20b is formed with the cylindrical steps S2 arranged in parallel in the right and left direction. On the other hand, in the second region 20B, which is the upper half part of the projection lens 20, the incident surface 20a is formed with the cylindrical steps S1 arranged in parallel in the upper and lower direction but the output surface 20b is not formed with the steps.

Figure 8:
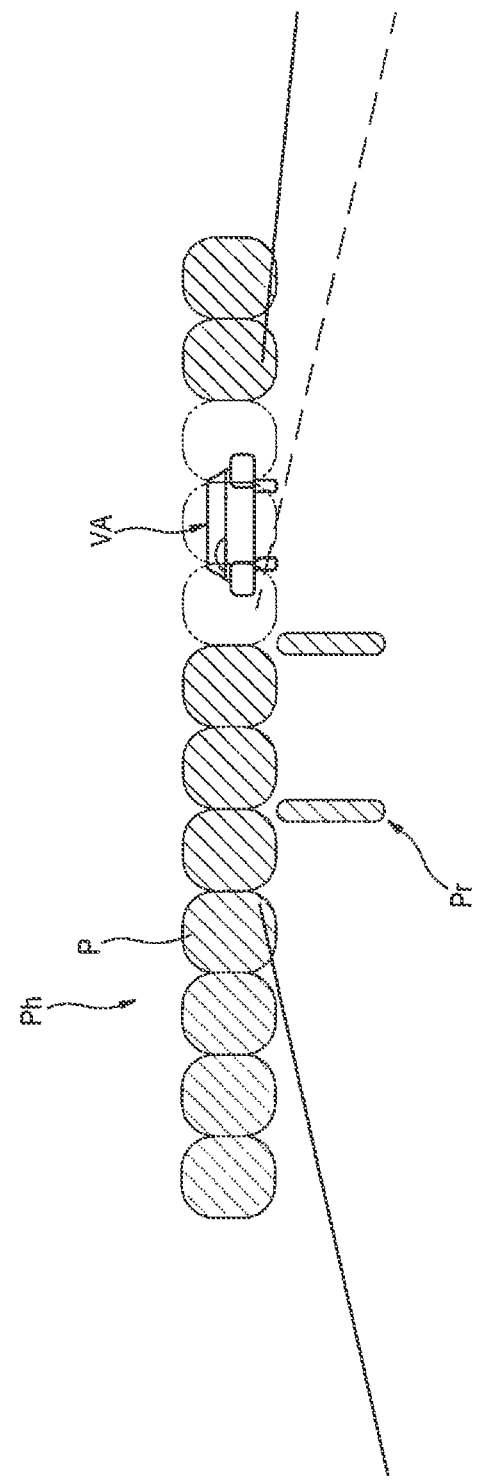
FIG. 8 depicts an example of respective light distribution patterns, which are to be formed by light emitted from a first light source group of the first illustrative embodiment and by light emitted from a second light source group.

FIG. 8 depicts an example of respective light distribution patterns, which are formed by the light emitted from the first light source group and by the light emitted from the second light source group.

As described above, the light $L_1$ from each LED chip of the first light source group 12 is illuminated ahead of the lamp, as light diffusing in both the upper and lower direction and the right and left direction. That is, the light source image of each LED chip of the first light source group 12 forms a light distribution pattern P having a substantially quadrangular shape on a virtual screen in front of the vehicle. Since the respective LED chips of the first light source group 12 are arranged along the right and left direction of the vehicle lamp 1, when all the LED chips are turned on, it is possible to form a horizontally long light distribution pattern Ph (for example, a high beam light distribution pattern) of which the light distribution patterns P having a substantially quadrangular shape are arranged in parallel in the right and left direction. Also, when the respective LED chips of the first light source group 12 are individually turned on and off by the control signal from the controller 40, it is possible to turn off a light only in a region in which an oncoming vehicle VA exists, as shown in FIG. 8, so that it is possible to prevent the glare to the oncoming vehicle VA.

As shown in FIGS. 5 and 7, the light $L_3$ from the second light source group 15 is illuminated ahead of the lamp, as the light diffusing only in the upper and lower direction. That is, as shown in FIG. 8, the light source image of the second light source group 15 can form a rectangular (linear) light distribution pattern Pr further extending in the upper and lower direction than in the right and left direction. The linear light distribution pattern Pr has an aspect ratio of 5 or greater, which is a ratio of a width in a front and rear direction to a width in the right and left direction, when a width of the vehicle in the right and left direction is set to 1, for example. Regarding the aspect ratio of the linear light distribution pattern Pr, the aspect ratio of the width in the front and rear direction to the width in the right and left direction is particularly preferably 1:10 or greater. Thereby, for example, the linear light distribution pattern Pr can illuminate a range from 10 m to 100 m ahead of the vehicle. When a vertically long linear light distribution pattern having an aspect ratio greater than the above-exemplified aspect ratio is required, it is possible to cope with the requirement by increasing the aspect ratio of the light source image, in addition to a method of changing a magnification of the light source image of the projection lens 20. For example, when the width of the vehicle in the right and left direction is set to 1, the aspect ratio of the light source image, which is to be formed by the light from the LED chip configuring the second light source group 15, i.e., the aspect ratio of the width in the upper and lower direction to the width in the right and left direction can be set to 1.5 to 5, for example. As the method of changing the aspect ratio of the light source image, the above aspect ratio can be implemented by a shape of the LED chip of the second light source group 15 or by arranging a plurality of LED chips in parallel.

In the meantime, the second light source group 15 may be configured by two LED chips and two linear light distribution patterns Pr may be formed by the two LED chips, Thereby, as shown in FIG. 8, it is possible to draw two parallel lines corresponding to a width of the vehicle on the road surface. Also, the vehicle lamp 1 may be respectively mounted on the right and left headlights of the vehicle and the linear light distribution patterns Pr may be formed to draw two lines by the respective lamps 1.

As described above, according to the first illustrative embodiment, the vehicle lamp 1 includes the first light source group 12 for forward illumination, the second light source group 15 for road surface drawing, the single projection lens 20 through which the lights emitted from the first light source group 12 and the second light source group 15 are to pass, and the light shade 30 arranged between the first light source group 12 and second light source group 15 and the projection lens 20 so that the light $L_1$ from the first light source group 12 and the light $L_3$ from the second light source group 15 do not intersect with each other before entering the projection lens 20. The projection lens 20 has the first region 20A through which the light $L_1$ from the first light source group 12 is to pass and the second region 20B through which the light $L_3$ from the second light source group 15 is to pass. The incident surface 20a of the projection lens 20 is formed with the cylindrical steps S1 configured to diffuse the respective light source images (lights $L_1$, $L_3$) of the first light source group 12 and the second light source group 15 so as to further extend in the upper and lower direction of the lamp than in the right and left direction of the lamp. Also, the output surface 20b of the projection lens 20 is formed in the first region 20A with the cylindrical steps S2 configured to further diffuse the light source image (light $L_1$) of the first light source group 12 in the right and left direction of the lamp than in the upper and lower direction of the lamp. According to this configuration, since the light distribution pattern for road surface thawing Pr as well as the light distribution pattern for forward illumination Ph is formed with a single unit, it is possible to save a space while satisfying both functions of the forward illumination and the road surface drawing. Also, the light shade 30 is arranged between the light source unit 10 and the projection lens 20 so that the light $L_1$ from the first light source group 12 and the light $L_3$ from the second light source group 15 do not intersect with each other before entering the projection lens 20. Therefore, it is possible to prevent an unintended light distribution, which is caused when the light from the first light source group 12 is incident on the second region 20B of the projection lens 20 or the light from the second light source group 15 is incident on the first region 20A of the projection lens 20.

Figure 9:
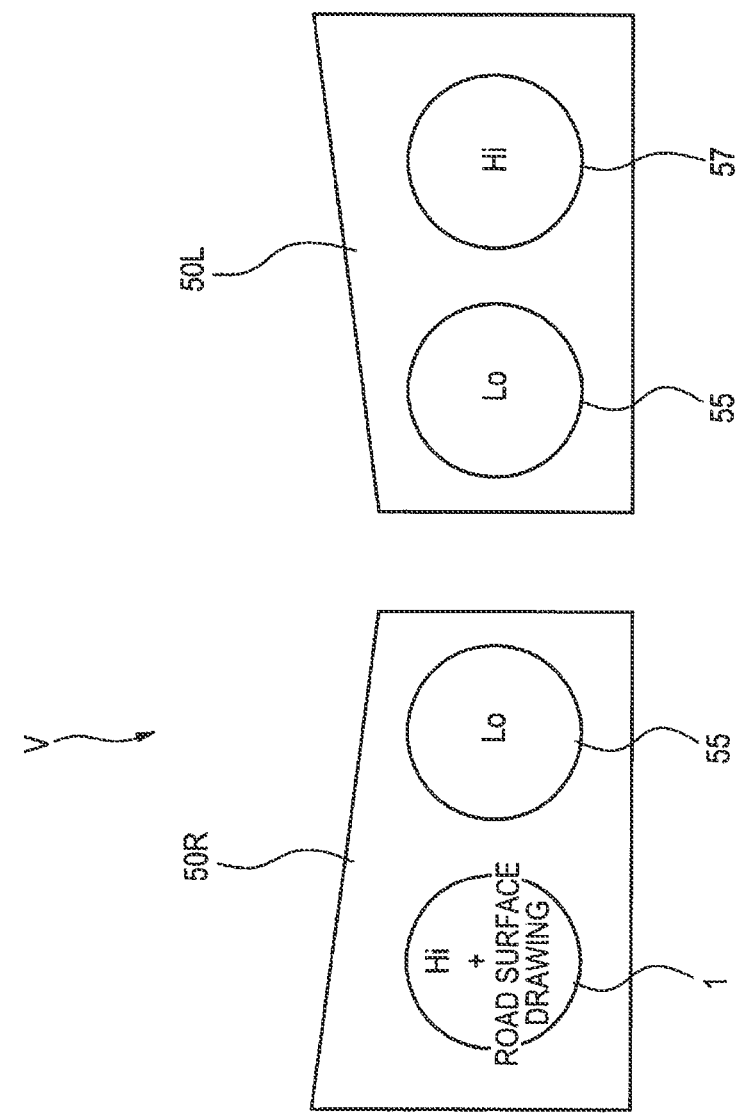
FIG. 9 depicts an example where the vehicle lamp of the first illustrative embodiment is mounted on a vehicle.

FIG. 9 depicts an example where the vehicle lamp of the first illustrative embodiment is mounted on a vehicle.

As shown in FIG. 9, a vehicle V has a pair of headlights 50L, 50R arranged at right and left sides of the front thereof. For example, in the right headlight 50R, the vehicle lamp 1 having both functions of high beam light distribution and road surface drawing in accordance with the first illustrative embodiment and a lamp for low beam 55 configured to form a low beam light distribution are mounted. Meanwhile, in the left headlight 50L, a lamp for low beam 55 and a lamp for high beam 57 configured to form a high beam light distribution are mounted. In this way, the multi-functional vehicle lamp 1 having functions of high beam and road surface drawing is mounted to any one of the left and right headlights 50L, 50R, so that it is possible to miniaturize the headlights 50L, 50R, as compared to the related art where a lamp for high beam and a lamp for road surface drawing are separately provided. Also, in the headlight (the left headlight 50L, in this example) in which the vehicle lamp 1 is not mounted, the lamp for low beam 55 and the lamp for high beam 57 are mounted to satisfy the required luminous intensity of the high beam light distribution.

In the meantime, a swivel mechanism configured to swivel a light distribution direction of the vehicle lamp 1 in the left and right direction may be provided and the swivel mechanism may be configured to mechanically swivel the vehicle lamp 1, so that it is possible to move the light distribution direction (the direction of the optical axis Ax of the projection lens 20) in the right and left direction. Thereby, it is possible to arbitrarily change the illumination directions of the lights for forming the light distribution pattern for high beam Ph and the linear light distribution pattern Pr. For this reason, for example, it is possible to draw the linear light distribution pattern Pr on the road surface toward a direction in which a target such as a pedestrian is detected.

Figure 10A:
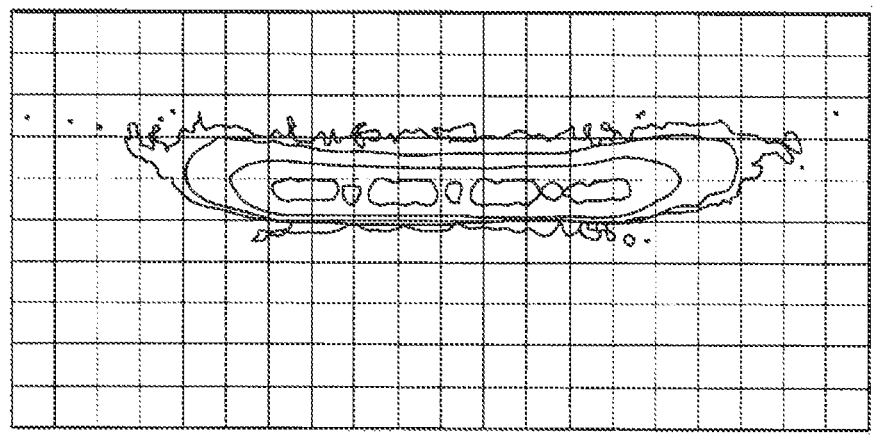
FIG. 10A depicts an illuminance distribution on a virtual screen of a light distribution pattern, which is formed by the light from the first light source group when a high-reflectivity treatment has not been performed for the light shade.
Figure 10B:
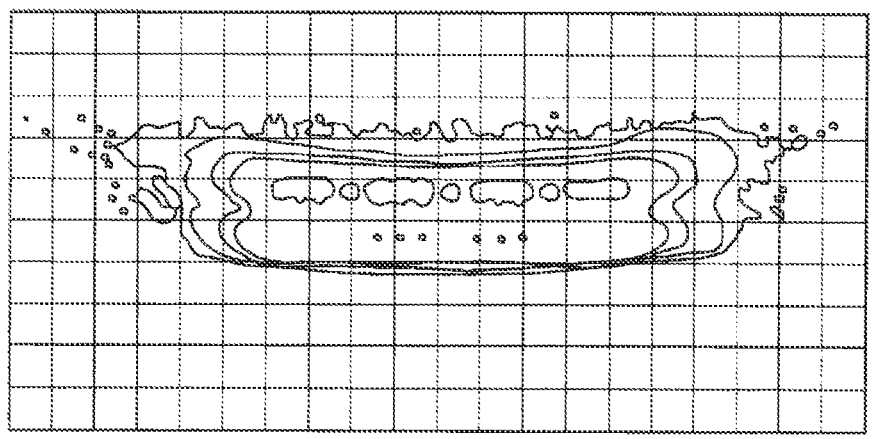
FIG. 10B depicts an illuminance distribution on the virtual screen of a light distribution pattern, which is formed by the light from the first light source group when the high-reflectivity treatment has been performed for the light shade.
Figure 11A:
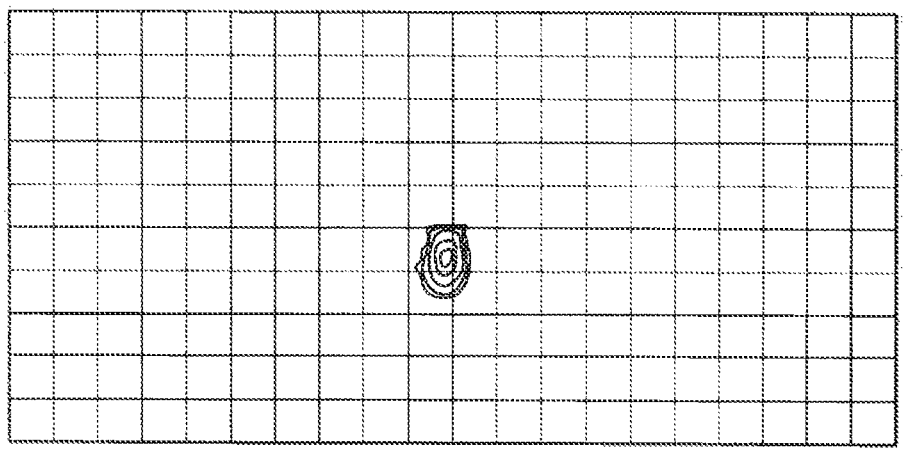
FIG. 11A depicts an illuminance distribution on the virtual screen of a light distribution pattern, which is formed by the light from the second light source group when the high-reflectivity treatment has not been performed for the light shade.
Figure 11B:
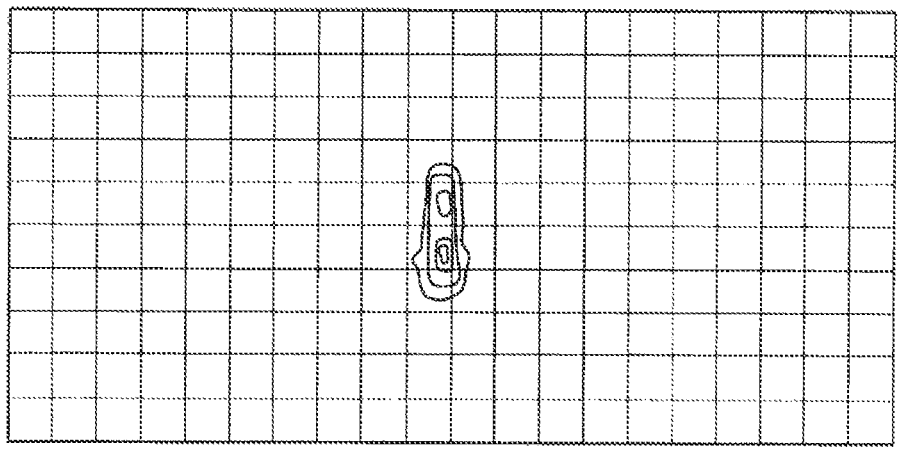
FIG. 11B depicts an illuminance distribution on the virtual screen of a light distribution pattern, which is formed by the light from the second light source group when the high-reflectivity treatment has been performed for the light shade.

FIGS. 10 and 11 depict (illuminance distributions) of light distribution patterns projected on a virtual screen provided in front of the vehicle lamp 1 and formed by the vehicle lamp 1. FIG. 10A depicts an illuminance distribution on the virtual screen of a light distribution pattern, which is formed by the light from the first light source group when the high-reflectivity treatment has not been performed for the light shade, and FIG. 10B depicts an illuminance distribution on the virtual screen of a light distribution pattern, which is formed by the light from the first light source group when the high-reflectivity treatment has been performed for the light shade. FIG. 11A depicts an illuminance distribution on the virtual screen of a light distribution pattern, which is formed by the light from the second light source group when the high-reflectivity treatment has not been performed for the light shade, and FIG. 11B depicts an illuminance distribution on the virtual screen of a light distribution pattern, which is formed by the light from the second light source when the high-reflectivity treatment has been performed for the light shade.

In the first illustrative embodiment, the low-reflectivity treatment has been performed for the lower surface 31 and the upper surface 32 of the light shade 30. However, the disclosure is not limited thereto. For example, the high-reflectivity treatment such as metal vapor deposition may be performed for the lower surface 31 and the upper surface 32 of the light shade 30. In this case, the light emitted from the first light source group 12 and reflected on the lower surface 31 of the light shade 30 is incident on the first region 20A of the incident surface 20a of the projection lens 20. Thereby, in the light distribution pattern for high beam shown in FIG. 10B, which is obtained when the high-reflectivity treatment has been performed, the range of the light distribution can be widened downwards, as compared to the light distribution pattern for high beam shown in FIG. 10A, which is obtained when the high-reflectivity treatment has not been performed. Also, the light emitted from the second light source group 15 and reflected on the upper surface 32 of the light shade 30 is incident on the second region 20B of the incident surface 20a of the projection lens 20. Thereby, in the light distribution pattern for road surface drawing shown in FIG. 11B, which is obtained when the high-reflectivity treatment has been performed, the range of the light distribution can be widened downwards, as compared to the light distribution pattern for road surface drawing shown in FIG. 11A, which is obtained when the high-reflectivity treatment has not been performed.

On the other hand, the lower surface 31 of the light shade 30 may be subjected to the high-reflectivity treatment and the upper surface 32 may be subjected to the low-reflectivity treatment. Alternatively, the treatments may be reversely performed.

Figure 12:
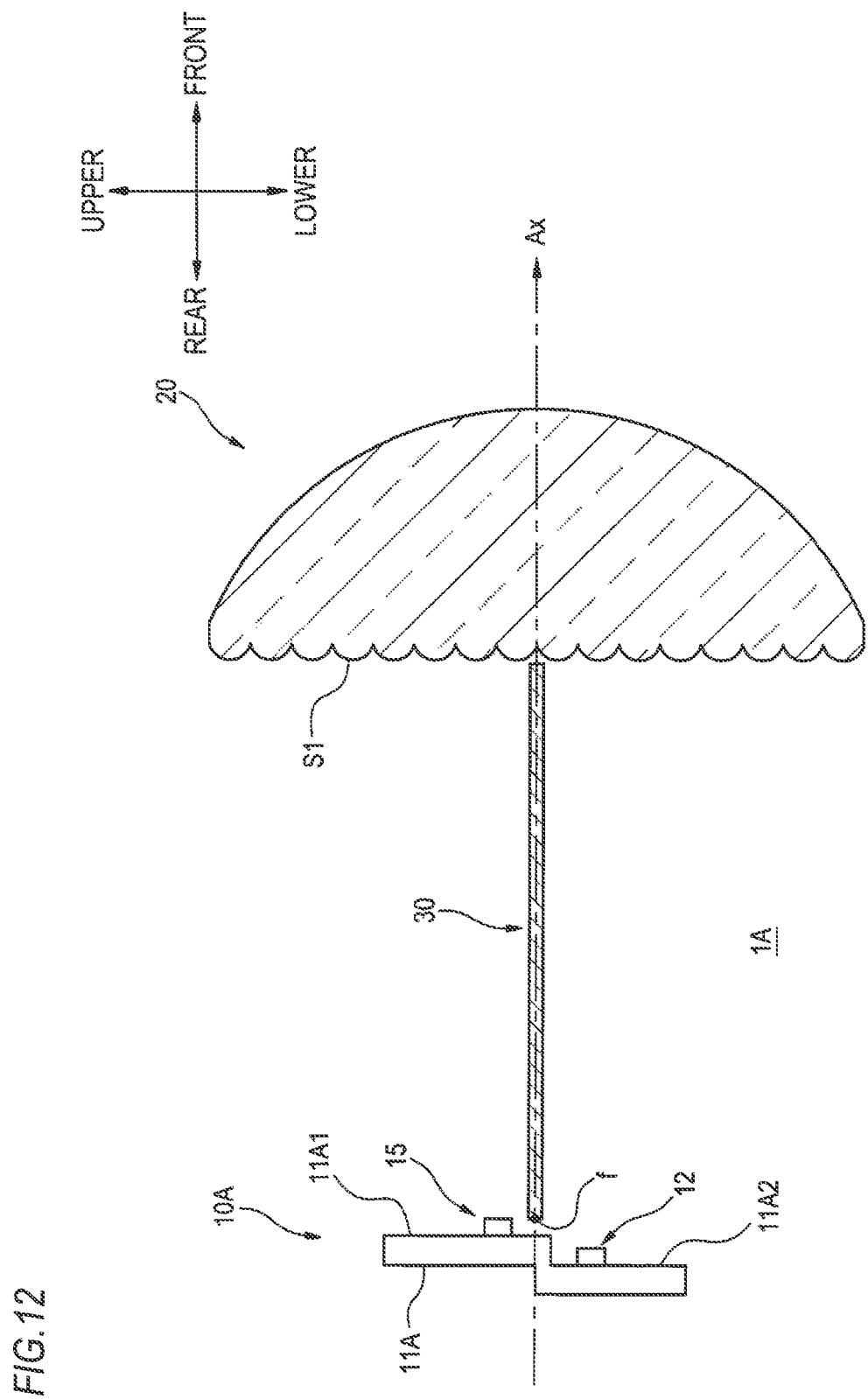
FIG. 12 is a vertically sectional view depicting a schematic structure of a vehicle lamp in accordance with a modified embodiment of the first illustrative embodiment.

FIG. 12 is a vertically sectional view depicting a schematic structure of a vehicle lamp in accordance with a modified embodiment of the first illustrative embodiment.

As shown in FIG. 12, a vehicle lamp 1A of the modified embodiment includes a light source unit 10A having a circuit board 11A, the first light source group 12 and the second light source group 15. The circuit board 11A is bent into a stair shape in the upper and lower direction of the lamp, and has a first surface 11A1 and a second surface 11A2 bent continuously from the first surface 11A1 in the rear direction of the lamp. The first surface 11A1 is mounted thereon with the second light source group 15, and the second surface 11A2 is mounted thereon with the first light source group 12. In the vehicle lamp 1A, the light emitting surface of the second light source group 15 is arranged along a direction in which the optical axis Ax and the back focal point f of the projection lens 20 intersect at right angles. The light emitting surface of the first light source group 12 is positioned at a rear side relative to the back focal point f.

In the first illustrative embodiment, as shown in FIG. 8, the light distribution pattern P having a substantially quadrangular shape is formed by the light $L_1$ from each LED chip of the first light source group 12 aligned in the right and left direction, and the plurality of light distribution patterns P having a substantially quadrangular shape is arranged in parallel in the right and left direction, so that the light distribution pattern for high beam Ph is formed. For this reason, a low-brightness part (so-called dark streak) may be formed at a boundary of the respective light distribution patterns P.

In contrast, like the modified embodiment shown in FIG. 12, when the first light source group 12 is arranged at the rear side relative to the back focal point f of the projection lens 20, an outer peripheral portion of the light distribution pattern P having a substantially quadrangular shape is broadened by a blurring effect caused due to defocus, so that it is possible to make the boundary of each light distribution pattern P less prominent.

In the first illustrative embodiment, the incident surface 20a of the projection lens 20 is formed with the cylindrical steps S1 for further extending the respective light source images of the first light source group 12 and the second light source group 15 in the upper and lower direction of the lamp than in the right and left direction of the lamp. However, the disclosure is not limited thereto. For example, the incident surface 20a of the projection lens 20 may not be provided with the diffusion step, and the output surface 20b of the projection lens 20 may be formed in the second region 20B with cylindrical steps arranged in parallel in the upper and lower direction. Thereby, the output surface 20b of the projection lens 20 has the cylindrical steps arranged in parallel in the upper and lower direction in the upper half part, which is the second region 20B, and the steps S2 arranged in parallel in the right and left direction in the lower half part, which is the first region 20A. In this case, while the light source image of the second light source group 15 forms the light distribution pattern further extending in the upper and lower direction than in the right and left direction, like the first illustrative embodiment, the light source image of each LED chip of the first light source group 12 forms the light distribution pattern further extending in the right and left direction than in the upper and lower direction, unlike the first illustrative embodiment.

Second Illustrative Embodiment

Figure 13:
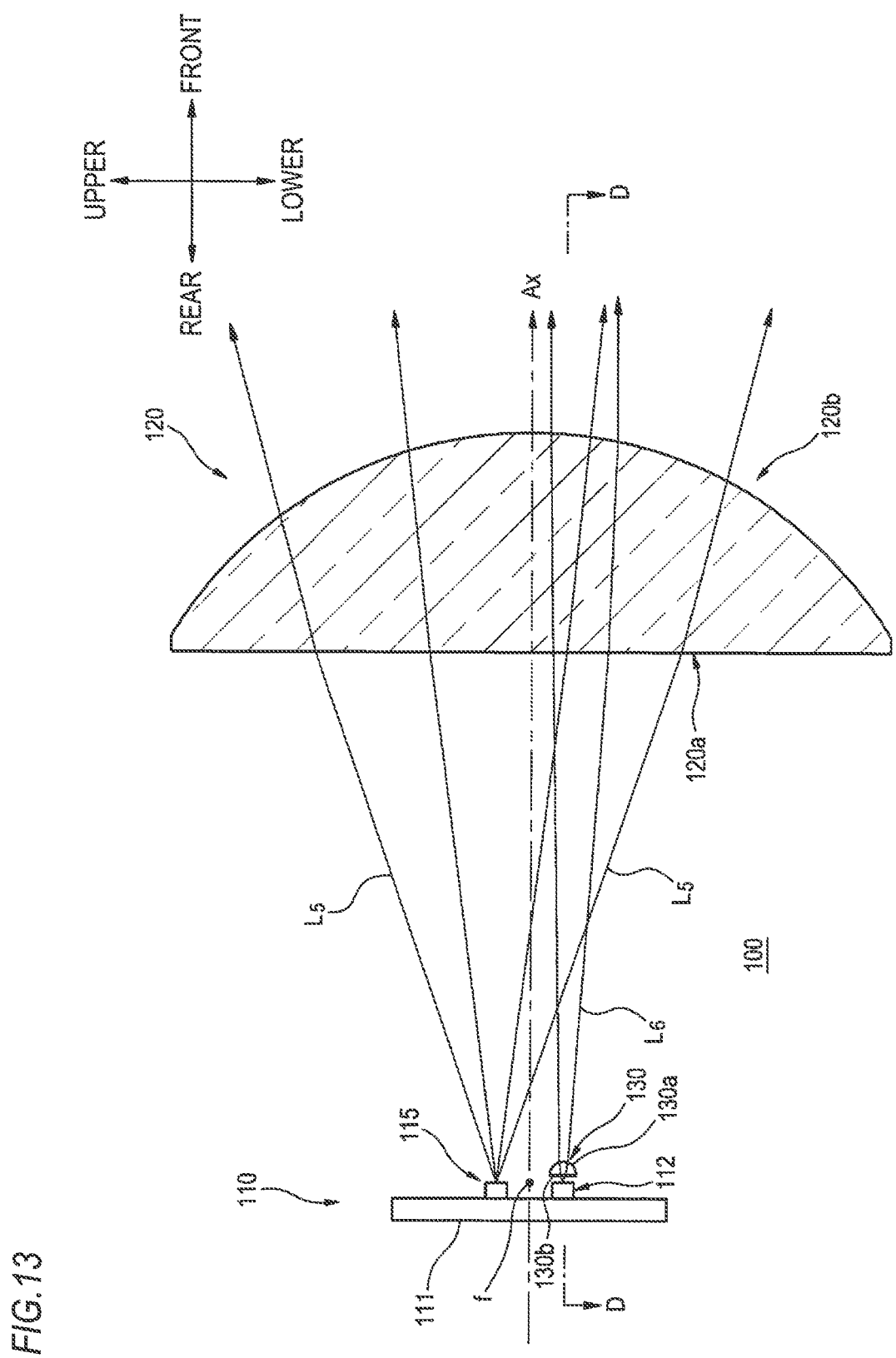
FIG. 13 is a vertically sectional view depicting a schematic structure of a vehicle lamp in accordance with a second illustrative embodiment of the disclosure.

FIG. 13 is a vertically sectional view depicting a schematic structure of a vehicle lamp in accordance with a second illustrative embodiment.

A vehicle lamp 100 of the first illustrative embodiment is a lamp unit for road surface drawing (road surface drawing device) mounted to at least one of a pair of headlights arranged at right and left sides of a front of a vehicle. FIG. 13 depicts a structure of the lamp unit for road surface drawing mounted to one headlight, as the vehicle lamp 100. In FIG. 13, the lamp body and the transparent cover are not shown.

As shown in FIG. 13, the vehicle lamp 100 includes a light source unit 110, a projection lens 120 and a plurality of additional lenses 130 (an example of the first additional optical system). The respective constitutional elements are attached to the lamp body by a support mechanism (not shown). Since the configuration of the light source unit 110 is the same as the light source unit 10 of the first illustrative embodiment, the detailed description thereof is omitted.

Figure 14:
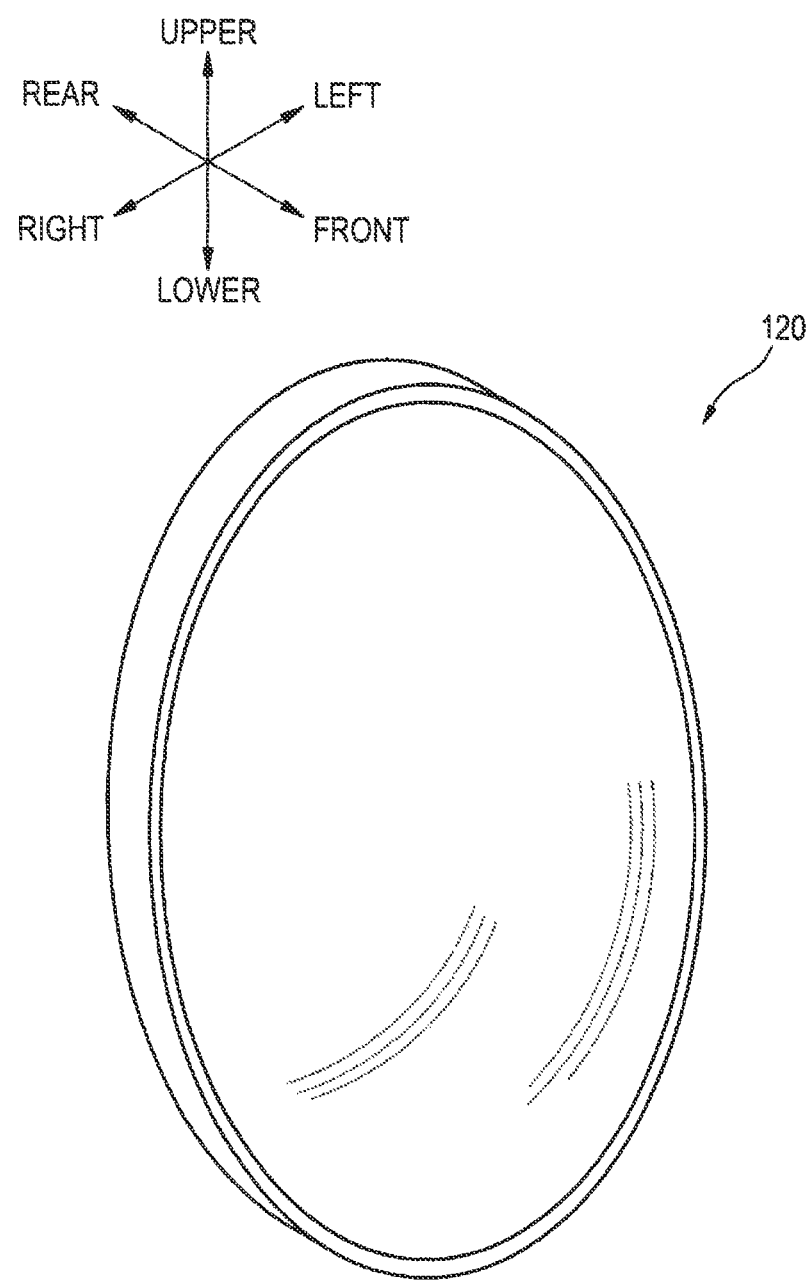
FIG. 14 is a front perspective view depicting a projection lens in accordance with the second illustrative embodiment.

The projection lens 120 has an incident surface 120a and an output surface 120b. The incident surface 120a of the projection lens 120 is arranged to face light emitting surfaces of LED chips configuring a first light source group 112 and a second light source group 115, and the output surface 120b is arranged to face ahead of the lamp. The projection lens 120 is arranged so that the light emitting surfaces of the LED chips of the first light source group 112 and the second light source group 115 are positioned on a plane orthogonal to the back focal point f on the optical axis Ax. As shown in FIG. 14, the output surface 120b of the projection lens 120 has a substantially elliptic spherical surface shape. That is, a horizontally sectional shape of the output surface 120b is a curved line of a substantially elliptic arc shape of which a radius of curvature is smaller than a vertically sectional shape thereof.

Figure 15:
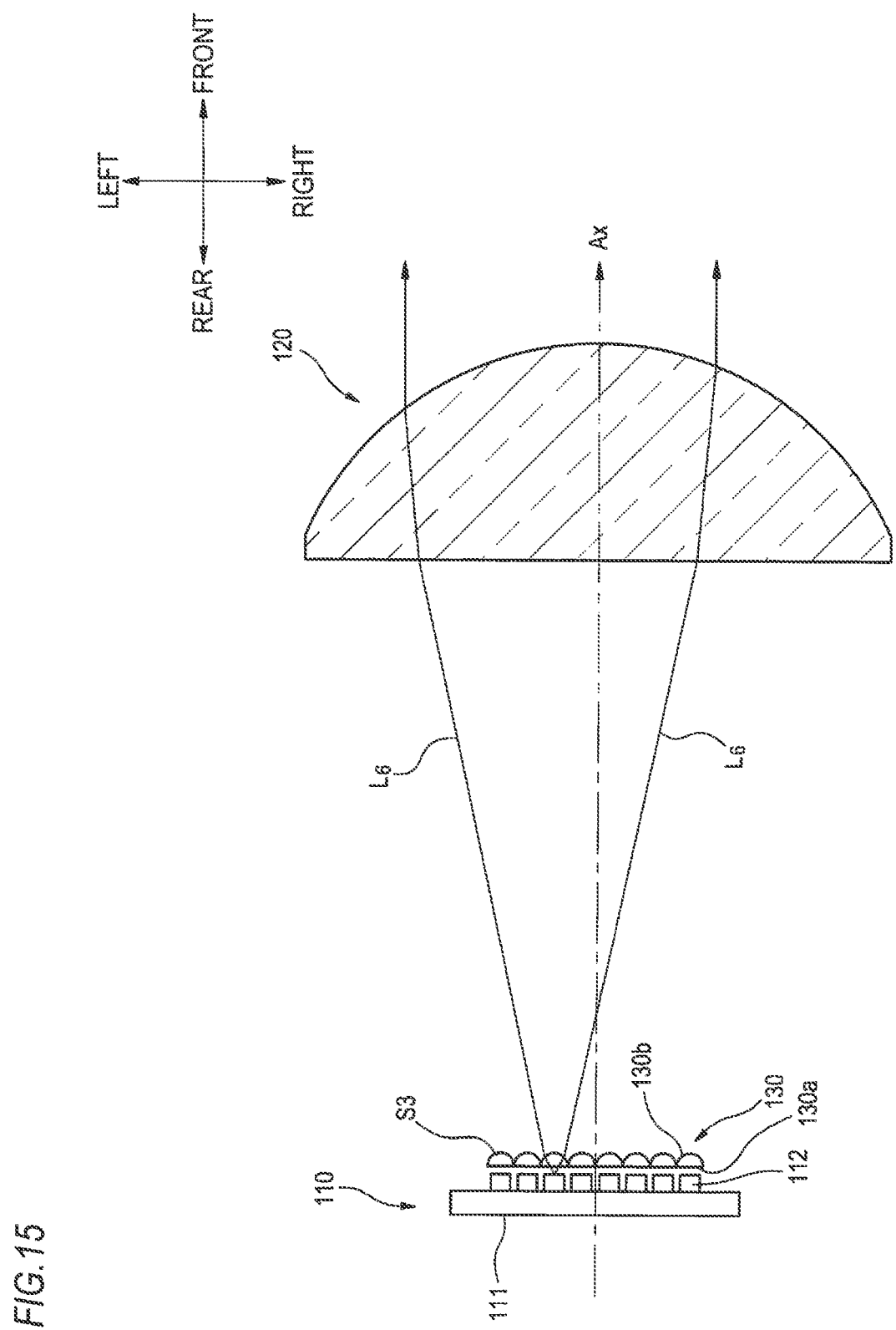
FIG. 15 is a sectional view taken along a line D-D of FIG. 13.

As shown in FIGS. 13 and 15, the plurality of additional lenses 130 is small plan-convex lenses arranged in parallel in the right and left direction so as to be close to the respective LED chips of the first light source group 112. The additional lens 130 has an incident surface 130a, which is arranged to face each LED chip of the first light source group 112 and the light to be emitted from each LED chip is to be incident thereto, and an output surface 130b arranged to face the incident surface 12a of the projection lens 120. The output surface 130b of the additional lens 130 is formed with a diffusion step S3 (an example of the third diffusion step) in a sectional view in the right and left direction shown in FIG. 15. Although not shown, the diffusion step S3 is a plurality of cylindrical steps arranged in parallel in the right and left direction, for example.

As shown in FIG. 13, the light $L_5$ emitted from the second light source group 115 is directly incident on the incident surface 120a of the projection lens 120 and is then emitted outward from the output surface 120b having a substantially elliptic spherical surface shape. At this time, since the horizontally sectional shape of the output surface 120b of the projection lens 120 is a curved line of a substantially elliptic arc shape of which a radius of curvature is smaller than the vertically sectional shape, the light $L_5$ having passed through the projection lens 120 diffuses so that the light source image to be formed by the light $L_5$ further extends in the upper and lower direction than in the right and left direction. That is, the light source image of the second light source group 115 passes through the projection lens 120 having a substantially elliptic shape, so that it is illuminated ahead of the lamp, as a light distribution pattern (for example, the linear light distribution pattern Pr shown in FIG. 8) larger than in the upper and lower direction than in the right and left direction.

In the meantime, the light $L_6$ emitted from the respective LED chips of the first light source group 112 passes through the additional lenses 130 and is then incident on the incident surface 120a of the projection lens 120. At this time, since there is no diffusion step or the like neither on the incident surface 130a nor on the output surface 130b, in the vertical sections of the additional lenses 130, the light source image that is to be formed by the light $L_6$ emitted from each LED chip of the first light source group 112 does not extend in the upper and lower direction. On the other hand, since the output surfaces 130b are formed with the cylindrical steps S3 arranged in parallel along the right and left direction, in the horizontal sections of the additional lenses 130, the light $L_6$ incident on the additional lenses 130 is diffusively emitted so that the light source image to be formed by the light $L_6$ extends in the right and left direction by the cylindrical steps S3 on the output surfaces 130b. That is, the light $L_6$ having passed through the additional lenses 130 is incident on the incident surface 120a of the projection lens 120, as the light source image larger in the right and left direction than in the upper and lower direction. At this time, since the output surface 120b of the projection lens 120 has a vertically long elliptic spherical surface shape, as described above, the light having passed through the projection lens 120 is diffusively emitted in the upper and lower direction rather than in the right and left direction. In this way, the light $L_6$ from the first light source group 112 is diffused in the right and left direction in the additional lenses 130 and is then diffused in the upper and lower direction in the projection lens 120 having a substantially elliptic shape, so that it is illuminated ahead of the lamp, as the light distribution pattern (for example, the light distribution pattern for high beam Ph shown in FIG. 8) extending both in the right and left direction and the upper and lower direction.

As described above, according to the second illustrative embodiment, the vehicle lamp 100 includes the first light source group 112 for forward illumination, the second light source group 115 for road surface drawing, the single projection lens 120 through which the lights emitted from the first light source group 112 and the second light source group 115 are to pass through, and the additional lenses 130 provided to be close to the first light source group 112 between the first light source group 112 and the projection lens 120. The projection lens 120 is configured so that the respective light source images of the first light source group 112 and the second light source group 115 are to further extend in the upper and lower direction than in the right and left direction, and the additional lenses 130 are configured so that the light source image of the first light source group 112 is to further extend in the right and left direction than in the upper and lower direction. According to this configuration, like the first illustrative embodiment, it is possible to form the light distribution pattern for forward illumination Ph extending subequally in the right and left and the upper and lower directions by the light $L_6$ from the first light source group 112 and to form the light distribution pattern for road surface drawing Pr further extending in the upper and lower direction than in the right and left direction by the light $L_5$ from the second light source group 115, with a single unit.

Meanwhile, in the second illustrative embodiment, the projection lens 120 has the output surface 120b having a substantially elliptic spherical surface shape. However, the disclosure is not limited thereto. For example, a projection lens having cylindrical steps arranged in the upper and lower direction and formed on any one of an incident surface and an output surface thereof may be used. Also in this case, since the lights from the first light source group 112 and the second light source group 115 are diffused in the upper and lower direction by the projection lens, it is possible to obtain the desired light distribution patterns by a combination with the additional lenses 130.

Also, a plano-convex additional lens (an example of the second additional optical system) may be arranged to be close to the second light source group 115, in addition to the plurality of additional lenses 130. The additional lens provided for the second light source group 115 is preferably formed on its output surface with a plurality of cylindrical steps arranged in parallel in the upper and lower direction. Thereby, it is possible to form the light distribution pattern for forward illumination Ph and the light distribution pattern for road surface drawing Pr with a single unit without forming the projection lens into a vertically long elliptic shape or forming a predetermined step on the projection lens.

Also, the configurations of the first illustrative embodiment and the second illustrative embodiment may be combined. That is, also in the second illustrative embodiment, the light shade 30 of the first illustrative embodiment may be arranged between the light source unit 110 and the projection lens 120. Thereby, it is possible to prevent an unintended light distribution, which is caused when the light from the first light source group 112 and the light from the second light source group 115 intersect with each other.

Figure 16A:
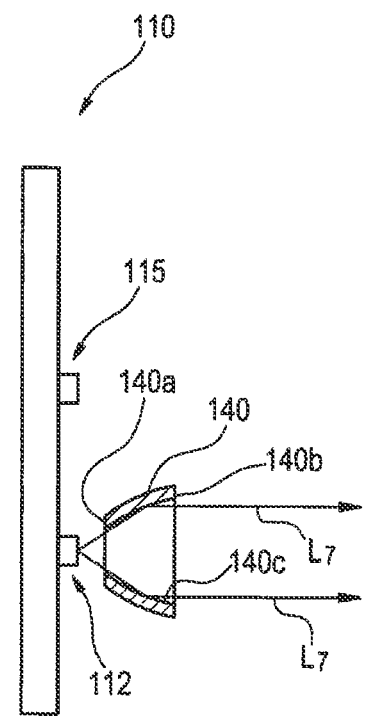
FIG. 16A is a vertically sectional view depicting a partial configuration of a vehicle lamp in accordance with a modified embodiment of the second illustrative embodiment.
Figure 16B:
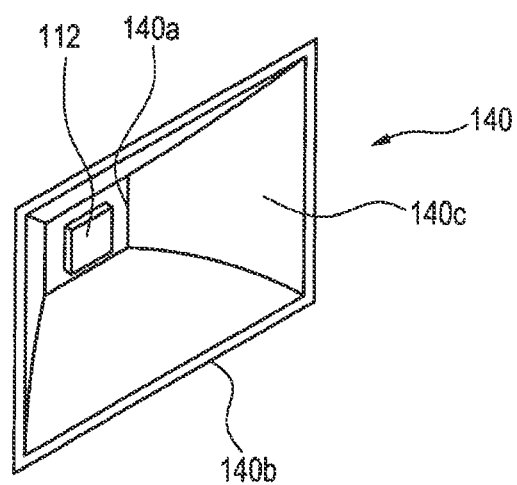
FIG. 16B is a perspective view of a reflector shown in FIG. 16A.

FIG. 16 is a vertically sectional view depicting a partial configuration of a vehicle lamp in accordance with a modified embodiment of the second illustrative embodiment.

In this modified embodiment, a reflector 140 (an example of the first additional optical system) is arranged in the vicinity of the first light source group 112, in place of the additional lenses 130 of the second illustrative embodiment. The reflector 140 has a rectangular box shape having openings 140a, 140b, which are respectively formed on a surface facing the first light source group 112 and a surface facing the projection lens (not shown). The opening 140a is greater than the light emitting surfaces of the respective LED chips of the first light source group 112 and the opening 140b has a horizontally long rectangular shape (wider in the right and left direction than in the upper and lower direction). The light $L_7$ incident on the reflector 140 from the opening 140a facing toward the first light source group 112 is reflected on a reflecting surface 140c of the reflector 140 and is then emitted from the opening 140b. At this time, since the opening 140b at the output surface-side has a horizontally long rectangular shape, the light $L_7$ from the first light source group 112 forms a light source image further extending in the right and left direction than in the upper and lower direction in the opening 140b.

Although not shown, also in this modified embodiment, the projection lens 120 having a substantially elliptic spherical surface shape, which is used in the second illustrative embodiment, or a projection lens having a plurality of cylindrical steps arranged in the upper and lower direction and formed on any one of an incident surface and an output surface thereof is used, so that the respective light source images of the first light source group 112 and the second light source group 115 further extend in the upper and lower direction than in the right and left direction. In this way, it is possible to obtain the desired light distribution patterns for forward illumination and road surface drawing by combining the reflector 140 and the projection lens 120.

Also, a reflector (an example of the second additional optical system) of which a direction is rotated from the direction of the reflector 140 about an axis parallel with the optical axis of the projection lens by 90° and which has a vertically long rectangular opening may be separately arranged in the vicinity of the second light source group 115. Also in this configuration, it is possible to form the light distribution pattern Pr further extending in the upper and lower direction than in the right and left direction while forming the light distribution pattern Ph further extending in the right and left direction than in the upper and lower direction.

Figure 17A:
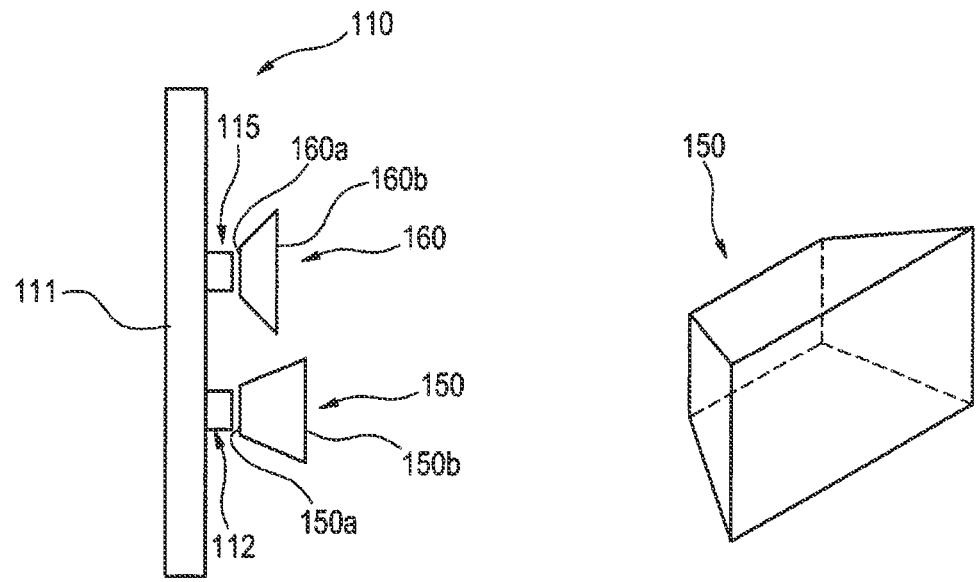
FIG. 17A is a vertically sectional view depicting a partial configuration of a vehicle lamp in accordance with another modified embodiment of the second illustrative embodiment.
Figure 17B:
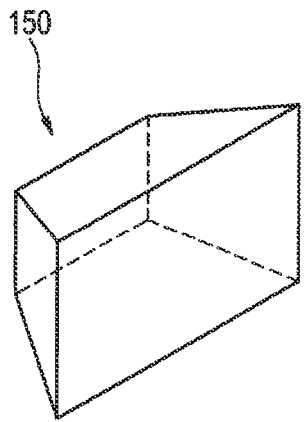
FIG. 17B is a perspective view of a light guide member shown in FIG. 17A.

FIG. 17 is a vertically sectional view depicting a partial configuration of a vehicle lamp in accordance with another modified embodiment of the second illustrative embodiment.

In this modified embodiment, a light guide member 150 is arranged in the vicinity of the first light source group 112, instead of the additional lenses 130 of the second illustrative embodiment. The light guide member 150 has a substantially trapezoidal conical shape, and has an incident surface 150a arranged to face the first light source group 112 and an output surface 150b arranged to face the projection lens (not shown). The incident surface 150a is greater than the light emitting surfaces of the respective LED chips of the first light source group 112 and the output surface 150b has a horizontally long rectangular shape (wider in the right and left direction than in the upper and lower direction). The light emitted from the first light source group 112 and incident from the incident surface 150a of the light guide member 150 passes through an inside of the light guide member 150 and is then emitted from the output surface 150b. At this time, since the output surface 150b has a horizontally long rectangular shape, the light from the first light source group 112 forms a light source image further extending in the right and left direction than in the upper and lower direction on the output surface 150b.

Also, a light guide member 160 is arranged in the vicinity of the second light source group 115. The light guide member 160 has a substantially trapezoidal conical shape, and has an incident surface 160a arranged to face the second light source group 115 and an output surface 160b arranged to face the projection lens (not shown). The incident surface 160a is greater than the light emitting surface of the LED chip of the second light source group 115 and the output surface 160b has a vertically long rectangular shape (wider in the upper and lower direction than in the right and left direction). The light emitted from the second light source group 115 and incident from the incident surface 160a of the light guide member 160 passes through an inside of the light guide member 160 and is then emitted from the output surface 160b. At this time, since the output surface 160b has a vertically long rectangular shape, the light from the second light source group 115 forms a light source image further extending in the upper and lower direction than in the right and left direction on the output surface 160b.

According to this configuration, the light from the first light source group 112 can be incident on the projection lens, as a light source image further extending in the right and left direction than in the upper and lower direction, and the light from the second light source group 115 can be incident on the projection lens, as a light source image further extending in the upper and lower direction than in the right and left direction. The projection lens may be formed with a predetermined diffusion step or may have a vertically or horizontally long elliptic shape.

In the meantime, a reflecting surface treatment may be performed on side surfaces except for the incident surfaces 150a, 160a and the output surfaces 150b, 160b of the light guide members 150, 160. Thereby, it is possible to improve the luminous intensity of the light to be emitted from the output surfaces 150a, 160a by totally reflecting the lights from the first light source group 112 and the second light source group 115 on the reflecting surface-treated side surfaces of the light guide members 150, 160.

Figure 18:
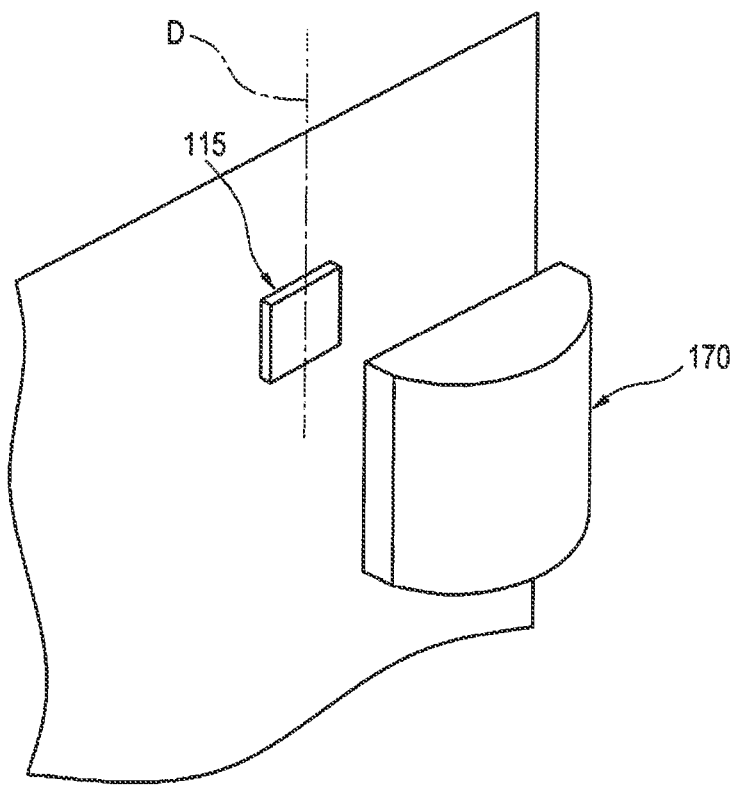
FIG. 18 is a perspective view depicting a partial configuration of a vehicle lamp in accordance with still another modified embodiment of the second illustrative embodiment.

FIG. 18 is a perspective view depicting a partial configuration of a vehicle lamp in accordance with still another modified embodiment of the second illustrative embodiment.

A cylindrical lens 170 shown in FIG. 18 is a cylindrical plano-convex lens and is arranged so that a focal line direction D is a vertical direction. The cylindrical lens 170 is configured as a lens that has a curvature of a convex lens in the horizontal direction and has no curvature in the vertical direction. Thereby, only the horizontal direction of the cylindrical lens 170 acts as the plano-convex lens, so that the light is refracted in a light focusing direction. When the cylindrical lens 170 is arranged in the vicinity of the second light source group 115, for example, the light from the second light source group 115 is focused in the right and left direction, so that the light can form a light source image larger in the upper and lower direction than in the right and left direction at a stage where the light has passed through the cylindrical lens 170. Also, when a cylindrical lens of which a direction is rotated from the direction of the cylindrical lens 170 about the optical axis of the lamp by 90° is arranged in the vicinity of each LED chip of the first light source group 112, it is possible to form a light source image further extending in the right and left direction than in the upper and lower direction at a stage where the light has passed through the cylindrical lens. For this reason, it is possible to obtain the desired light distribution patterns for forward illumination and road surface drawing by combining the cylindrical lens and the projection lens.

In the meantime, a toric lens can also be used, in place of the cylindrical lens.

Although the illustrative embodiments of the disclosure have been described, the disclosure is not limited to the illustrative embodiments and can adopt other configurations, as necessary.

The invention claimed is:

1. A vehicle lamp for a vehicle, comprising:
a first light source group comprising at least one light emitting element and configured to form a first illumination pattern forward of the vehicle;
a second light source group comprising at least one light emitting element provided separately from the at least one light emitting element of the first light source group and configured to draw a second illumination pattern on a road surface;
a single projection lens through which lights emitted from the first light source group and the second light source group are to pass, and
a light shade arranged between the first and second light source groups and the projection lens so that the light from the first light source group and the light from the second light source group do not intersect with each other before entering the projection lens,
wherein the projection lens has a first region through which the light from the first light source group is to pass and a second region through which the light from the second light source group is to pass, and
wherein the projection lens is formed with a first diffusion step configured to further extend a light source image of the second light source group in an upper and lower direction of the lamp than in a right and left direction of the lamp and a second diffusion step configured to further extend a light source image of the first light source group in the right and left direction of the lamp than in upper and lower direction of the lamp.

2. The vehicle lamp according to claim 1, wherein the first diffusion step comprises a step configured to further extend the light source image of the first light source group in the upper and lower direction of the lamp than in the right and left direction of the lamp.

3. The vehicle lamp according to claim 1,
wherein the first diffusion step is formed on an incident surface of the projection lens, and
wherein the second diffusion step is formed on an output surface of the projection lens, in the first region.

4. The vehicle lamp according to claim 1,
wherein the light shade has a first surface arranged to face toward the first light source group and a second surface arranged to face toward the second light source group, and
wherein a high-reflectivity treatment has been performed for one or both of the first surface and the second surface.

5. The vehicle lamp according to claim 1,
wherein the light shade has a first surface arranged to face toward the first light source group and a second surface arranged to face toward the second light source group, and
wherein a low-reflectivity treatment has been performed for one or both of the first surface and the second surface.

6. The vehicle lamp according to claim 1, further comprising
an additional optical system provided to be close to the first light source group between the first light source group and the projection lens,
wherein the additional optical system is configured to further extend a light source image of the first light source group in a right and left direction of the lamp than in an upper and lower direction of the lamp, and
wherein the projection lens is formed with a first diffusion step configured to further extend respective light source images of the first light source group and the second light source group in the upper and lower direction of the lamp than in the right and left direction of the lamp.

7. A vehicle lamp comprising:
a first light source group comprising at least one light emitting element and configured to form a first illumination pattern forward of the vehicle;

a second light source group comprising at least one light emitting element provided separately from the at least one light emitting element of the first light source group and configured to draw a second illumination pattern on a road surface;

a single projection lens through which lights emitted from the first light source group and the second light source group are to pass, and a first additional optical system provided to be close to the first light source group between the first light source group and the projection lens, wherein the projection lens is configured to further extend respective light source images of the first light source group and the second light source group in an upper and lower direction of the lamp than in a right and left direction of the lamp, and wherein the first additional optical system is configured to further extend the light source image of the first light source group in the right and left direction of the lamp than in the upper and lower direction of the lamp.

8. The vehicle lamp according to claim 7, wherein the first additional optical system is configured by an additional lens having an incident surface arranged to face the first light source group and an output surface arranged to face the projection lens, and the output surface is formed with a third diffusion step configured to extend the light source image of the first light source group.

9. The vehicle lamp according to one of claim 7, wherein the first additional optical system is configured by a reflector having openings, which are respectively formed on a surface arranged to face the first light source group and a surface arranged to face the projection lens, and wherein the opening formed on the surface arranged to face the projection lens has a width in the right and left direction of the lamp greater than a width in the upper and lower direction of the lamp.

10. The vehicle lamp according to claim 7, wherein the first additional optical system is configured by a light guide member having an incident surface arranged to face the first light source group and an output surface arranged to face the projection lens, and wherein the output surface has a width in the right and left direction of the lamp greater than a width in the upper and lower direction of the lamp.

11. The vehicle lamp according to claim 7, wherein the first additional optical system is configured by a cylindrical lens, and wherein the cylindrical lens is arranged so that a focal line direction thereof is parallel with the right and left direction of the lamp.

12. The vehicle lamp according to claim 1, wherein the first light source group comprises a plurality of the light emitting elements, and wherein the plurality of light emitting elements is positioned at a rear side relative to a back focal point of the projection lens in a front and rear direction of the lamp.

13. A vehicle comprising:

a first structure at one of a front-right position and a front-left position of the vehicle; and a second structure at another of the front-right position and the front-left position of the vehicle, wherein the vehicle lamp according to claim 1 is mounted on the first structure, and a forward illumination lamp configured to form a third illumination forward of the vehicle is mounted on the second structure.

* * * * *